(12) United States Patent
Nie et al.

(10) Patent No.: US 9,787,432 B2
(45) Date of Patent: Oct. 10, 2017

(54) COMMUNICATIONS METHOD, SYSTEM, AND APPARATUS FOR OPTICAL NETWORK SYSTEM

(71) Applicant: Huawei Technologies Co., Ltd., Shenzhen (CN)

(72) Inventors: Shiwei Nie, Shenzhen (CN); Zhenping Wang, Shenzhen (CN); Zhiguang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 14/743,730

(22) Filed: Jun. 18, 2015

(65) Prior Publication Data
US 2015/0288484 A1    Oct. 8, 2015

Related U.S. Application Data

(63) Continuation of application No. PCT/CN2012/086824, filed on Dec. 18, 2012.

(51) Int. Cl.
*H03M 13/00* (2006.01)
*H04L 1/00* (2006.01)
(Continued)

(52) U.S. Cl.
CPC ........... *H04L 1/0045* (2013.01); *H04B 10/27* (2013.01); *H04J 14/0227* (2013.01); *H04L 1/00* (2013.01);
(Continued)

(58) Field of Classification Search
CPC . H04L 1/0057; H04L 25/4908; H04L 12/413; H04L 1/0045; H04L 1/00; H04B 10/27; H04J 14/0227
See application file for complete search history.

(56) References Cited

U.S. PATENT DOCUMENTS 6,029,264 A * 2/2000 Kobayashi ............ H03M 13/29
714/755
7,639,687 B1   12/2009 Tsai et al.
(Continued)

FOREIGN PATENT DOCUMENTS

CN   101312385 A   11/2008
CN   101436917 A    5/2009
(Continued)

OTHER PUBLICATIONS

"Series G: Transmission Systems and Media,Digital Systems and Networks; Digital sections and digital line system—Optical line systems for local and access networks; Phoneline networking transceivers—Isolation function," ITU-T G.989.3, International Telecommunication Union, Geneva, Switzerland (Mar. 2003).
(Continued)

*Primary Examiner* — Guy Lamarre
(74) *Attorney, Agent, or Firm* — Leydig, Voit & Mayer, Ltd.

(57) ABSTRACT

The present disclosure provides a method, a system, and an apparatus for data communication in an optical network system. A new encoding scheme is implemented in the following manner: performing 32-bit to 34-bit encoding on a data stream on which 8-bit/10-bit decoding has been performed, performing forward error correction encoding on the data stream on which the 32-bit to 34-bit encoding has been performed, and sending the encoded data stream; or performing forward error correction decoding on a received data stream, and performing 32-bit to 34-bit decoding on the data stream on which the forward error correction decoding has been performed. In this way, a bandwidth resource of a line is saved; line monitoring can be implemented without interrupting a service, which is easy to implement and
(Continued)

greatly improves various types of performance of the system.

10 Claims, 12 Drawing Sheets

(51) Int. Cl.
    *H04L 25/49*     (2006.01)
    *H04B 10/27*     (2013.01)
    *H04J 14/02*     (2006.01)
    *H04L 12/413*     (2006.01)

(52) U.S. Cl.
    CPC .......... *H04L 1/0057* (2013.01); *H04L 12/413* (2013.01); *H04L 25/4908* (2013.01)

(56) References Cited

U.S. PATENT DOCUMENTS

| | | | |
|---|---|---|---|
| 7,724,903 | B1 | 5/2010 | Kryzak et al. |
| 2002/0156913 | A1 | 10/2002 | Tsang et al. |
| 2005/0193292 | A1 | 9/2005 | Lin et al. |
| 2009/0077154 | A1 | 3/2009 | Matsuyama et al. |
| 2010/0223535 | A1 | 9/2010 | Geng et al. |
| 2011/0320905 | A1 | 12/2011 | Lin et al. |
| 2013/0051802 | A1 | 2/2013 | Chen et al. |

FOREIGN PATENT DOCUMENTS

| | | |
|---|---|---|
| CN | 101494497 A | 7/2009 |
| CN | 101651499 A | 2/2010 |
| CN | 101867442 A | 10/2010 |
| CN | 101902293 A | 12/2010 |
| CN | 102439996 A | 5/2012 |
| EP | 2101415 A1 | 9/2009 |
| JP | 2001298490 A | 10/2001 |
| JP | 2003289286 A | 10/2003 |
| JP | 2007036712 A | 2/2007 |
| JP | 2010517392 A | 5/2010 |
| RU | 2380736 C2 | 6/2006 |
| WO | WO 02080479 A1 | 10/2002 |
| WO | WO 2006096431 A2 | 9/2006 |

OTHER PUBLICATIONS

"IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment: Media Access Control (MAC) Parameters, Physical Layers, and Management Parameters for 10 Gb/s Operation," IEEE Std 802.3ae-2002, pp. i-516, Institute of Electrical and Electronics Engineers, New York, New York (Aug. 30, 2002).

* cited by examiner

| 32 bits | 34 bits | | | | | | | |
|---|---|---|---|---|---|---|---|---|
| Input data | First synchronization head | Data | | | | | | |
| | | 0 1 | 2 … 5 | 6 … 9 | 10…13 | 14…17 | 18…21 | 22…25 | 26…29 | 30…33 |
| D0D1D2D3 | 01 | D0 | | D1 | D2 | | D3 | |
| Input data | Second synchronization head | Mapping code | Code | | | | | |
| C0D1D2D3 | 10 | 1000 | K0 | D1 | | D2 | | D3 | |
| D0C1D2D3 | 10 | 0100 | D0 | | K1 | D2 | | D3 | |
| D0D1C2D3 | 10 | 0010 | D0 | | D1 | | K2 | D3 | |
| D0D1D2C3 | 10 | 0001 | D0 | | D1 | D2 | | K3 | |
| C0D1C2D3 | 10 | 1010 | K0 | K1 | D2 | | D3 | Rsvd | |
| …… | … | | | | | | | |
| C0C1C2C3 | 10 | 1111 | K0 | K1 | K2 | K3 | Rsvd (0x555) | |

FIG. 3

| First control character block(Binary) | Second control character block (Binary) |
|---|---|
| 000 11100 | 0000 |
| 001 11100 | 0001 |
| 010 11100 | 0010 |
| 011 11100 | 0011 |
| 100 11100 | 0100 |
| 101 11100 | 0101 |
| 110 11100 | 0110 |
| 111 11100 | 0111 |
| 111 10111 | 1000 |
| 111 11011 | 1001 |
| 111 11101 | 1010 |
| 111 11110 | 1011 |

COMMUNICATIONS METHOD, SYSTEM, AND APPARATUS FOR OPTICAL NETWORK SYSTEM

CROSS-REFERENCE

This application is a continuation of International Patent Application No. PCT/CN 2012/086824, filed on Dec. 18, 2012, which is hereby incorporated by reference in its entirety.

TECHNICAL FIELD

The present disclosure relates to the field of communications technologies, and in particular, to a communications method, system, and apparatus for an optical network system.

BACKGROUND

A passive optical network (PON) technology is one of fiber to the home (FTTH) technologies that are most widely used currently. Existing PONs may be classified into a power-splitting passive optical network and a wavelength division multiplexing passive optical network (WDMPON) according to a signal distribution manner. An existing broadband passive optical network (BPON), gigabit-capable passive optical network (GPON), Ethernet passive optical network (EPON), and the like are power-splitting passive optical networks. The WDMPON based on a wavelength division multiplexing technology implements uplink access by using the wavelength division multiplexing technology, is capable of providing a relatively high operating bandwidth, and implements symmetric broadband access.

In various PON systems, an 8b/10b encoding scheme is mainly adopted; however, adopting this encoding scheme has a bandwidth overhead up to 25%, and adopting this encoding scheme cannot implement a line detection function for an online service. Therefore, how to improve the existing encoding scheme to reduce a system overhead and implement the line detection function in a PON system becomes an urgent problem to be resolved.

SUMMARY

In view of this, embodiments of the present disclosure provide a communications method for an optical network system, and an optical network device and system, to resolve a problem that a system overhead is high and a line cannot be detected due to an existing encoding scheme of the optical network system. Adopting a new encoding scheme without changing a line rate reduces the system overhead and implements line detection, which is easy to implement and greatly improves various types of performance of the system.

According to a first aspect, the present disclosure provides a communications method for an optical network system, where the communications method includes: receiving a data stream from a physical medium attachment layer at a line rate, where the data stream is a data stream on which 8-bit/10-bit encoding has been performed; performing 8-bit/10-bit decoding on the received data stream; performing 32-bit to 34-bit encoding on the data stream on which the 8-bit/10-bit decoding has been performed; performing forward error correction encoding on the data stream on which the 32-bit to 34-bit encoding has been performed; performing bit width conversion of 34-bit/10-bit on the data stream on which the forward error correction encoding has been performed; and sending the data stream on which the bit width conversion has been performed to a physical medium dependent layer at the line rate.

In a first possible implementation manner of the first aspect, before the step of the performing 32-bit to 34-bit encoding on the data stream on which the 8-bit/10-bit decoding has been performed, the communications method further includes:

sequentially and consecutively receiving the data stream on which the 8-bit/10-bit decoding has been performed, to form four data blocks, where any one of the data blocks is a first control character block or a data character block, and any first control character block or any data character block is an 8-bit binary code; and determining whether a first control character block exists among the four data blocks.

With reference to the first aspect or the first possible implementation manner of the first aspect, in a second possible implementation manner, the performing 32-bit to 34-bit encoding on the data stream on which the 8-bit/10-bit decoding has been performed specifically includes:

if no first control character block exists among the four data blocks, adding a first synchronization head to a header of a first data block among the four data blocks, and outputting the data blocks to which the first synchronization head is added, where the first data block is an 8-bit binary code input first, the first synchronization head includes a 2-bit first identifier, and the first identifier is used to identify that the data blocks are all data character blocks.

With reference to the first aspect, the first possible implementation manner of the first aspect, or the second possible implementation manner of the first aspect, in a third possible implementation manner, the performing 32-bit to 34-bit encoding on the data stream on which the 8-bit/10-bit decoding has been performed specifically includes:

if at least one first control character block exists among the four data blocks, adding a second synchronization head to a header of a first data block among the four data blocks, where the first data block is an 8-bit binary code input first, the second synchronization head includes a 2-bit second identifier, and the second identifier is used to identify that at least one first control character block exists among the data blocks;

generating, according to a quantity of first control character blocks among the four data blocks and a location of the first control block among the data blocks, a 4-bit control character block location mapping code, and setting the control character block location mapping code, in a location after the second synchronization head and closely adjacent to the second synchronization head;

correspondingly converting the first control character block among the four data blocks into a 4-bit second control character block; and outputting the processed data blocks, where the processed data blocks include the second synchronization head, the control character block location mapping code, and the second control character block that is obtained after the conversion, or the processed data blocks include the second synchronization head, the control character block location mapping code, the second control character block that is obtained after the conversion, and the data character block.

With reference to the first aspect, the first possible implementation manner of the first aspect, the second possible implementation manner of the first aspect, and the third possible implementation manner of the first aspect, in a fourth possible implementation manner, the outputting the processed data blocks specifically includes:

if the four data blocks further include at least one data character block, performing no processing on the data character block among the four data blocks, and retaining the data character block among the data blocks; and outputting the processed data blocks, where the processed data blocks include the second synchronization head, the control character block location mapping code, the second control character block that is obtained after the conversion, and a data block of the data character block.

With reference to the first aspect, the first possible implementation manner of the first aspect, the second possible implementation manner of the first aspect, the third possible implementation manner of the first aspect, and the fourth possible implementation manner of the first aspect, in a fifth possible implementation manner, the method further includes: determining whether a quantity of bits that are included in the output processed data blocks is 34; and if the quantity of the bits that are included in the output processed data blocks is less than 34, adding a random number to a tail of a last data block among the output processed data blocks until the quantity of the bits of the output processed data blocks becomes 34, where the random number is a randomly-generated binary code.

With reference to the first aspect, the first possible implementation manner of the first aspect, the second possible implementation manner of the first aspect, the third possible implementation manner of the first aspect, the fourth possible implementation manner of the first aspect, and the fifth possible implementation manner of the first aspect, in a sixth possible implementation manner, after the step of the receiving a data stream from a physical medium attachment layer at a line rate, the communications method further includes: synchronizing the data stream on which the 8-bit/10-bit encoding has been performed.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, and the sixth possible implementation manner of the first aspect, in a seventh possible implementation manner, after the step of the performing 32-bit to 34-bit encoding on the data stream on which the 8-bit/10-bit decoding has been performed, the communications method further includes:

scrambling the data stream except the first synchronization head or the second synchronization head in the data stream on which the 32-bit to 34-bit encoding has been performed.

According to a second aspect, the present disclosure provides a communications method for an optical network system, where the communications method includes: receiving a data stream from a physical medium dependent layer at a line rate, where the data stream is a data stream on which 32-bit to 34-bit encoding has been performed;

performing bit width conversion of 10-bit/34-bit on the received data stream;

performing forward error correction decoding on the data stream on which the bit width conversion has been performed;

performing 32-bit to 34-bit decoding on the data stream on which the forward error correction decoding has been performed;

performing 8-bit/10-bit encoding on the data stream on which the 32-bit to 34-bit decoding has been performed; and sending the data stream on which the 8-bit/10-bit encoding has been performed to a physical medium attachment layer.

With reference to the second aspect, in a first possible implementation manner of the second aspect, before the step of the performing 32-bit to 34-bit decoding on the data stream on which the forward error correction decoding has been performed, the communications method further includes:

parsing the data stream on which the forward error correction decoding has been performed, and outputting 51 data blocks, where any one of the data blocks is a second control character block or a data character block, any second control character block is a 4-bit binary code, and any data character block is an 8-bit binary code;

parsing any one of the data blocks, and obtaining a synchronization head of the any one of the data blocks, where the synchronization head includes: a first synchronization head or a second synchronization head, the first synchronization head includes a 2-bit first identifier, the first identifier is used to identify that the data blocks are all data character blocks, the second synchronization head includes a 2-bit second identifier, and the second identifier is used to identify that at least one second control character block exists among the data blocks; and determining whether the synchronization head of the any one of the data blocks is a first synchronization head or a second synchronization head.

With reference to the second aspect or the first possible implementation manner of the second aspect, in a second possible implementation manner, the step of the performing 32-bit to 34-bit decoding on the data stream on which the forward error correction decoding has been performed specifically includes:

if the synchronization head is a first synchronization head, deleting the first synchronization head, and outputting the data blocks from which the first synchronization head is deleted.

With reference to the second aspect, the first possible implementation manner of the second aspect, or the second possible implementation manner of the second aspect, in a third possible implementation manner, the step of the performing 32-bit to 34-bit decoding on the data stream on which the forward error correction decoding has been performed specifically includes:

if the synchronization head is a second synchronization head, parsing the data blocks, and obtaining a 4-bit control character block location mapping code;

obtaining a quantity of the second control character blocks among the data blocks and a location of the second control character block among the data blocks according to the control character block location mapping code;

correspondingly converting the second control character block among the data blocks into an 8-bit first control character block according to the quantity of the second control character blocks and the location of the second control character block among the data blocks;

deleting the second synchronization head and the control character block location mapping code from the data blocks, where the control character block location mapping code is in a location after the second synchronization head and closely adjacent to the second synchronization head; and outputting the processed data blocks, where the processed data blocks include: the first control character block and/or the data character block, and any first control character block or any data character block is an 8-bit binary code.

With reference to the second aspect, the first possible implementation manner of the second aspect, the second possible implementation manner of the second aspect, or the third possible implementation manner of the second aspect, in a fourth possible implementation manner, the step of the outputting the processed data blocks specifically includes:

if the data blocks further include at least one data character block, performing no processing on the data character block among the data blocks, and retaining the data character block; and outputting the processed data blocks, where the processed data blocks include: the first control character and the data character block.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, before the step of the performing bit width conversion of 10-bit/34-bit on the received data stream, the communications method further includes: synchronizing the received data stream.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, before the step of the performing 32-bit to 34-bit decoding on the data stream on which the forward error correction decoding has been performed, the communications method further includes:

descrambling the data stream except the first synchronization head or the second synchronization head in the data stream on which the forward error correction decoding has been performed.

According to a third aspect, the present disclosure provides an optical network device, where the optical network device includes:

a first interface unit, configured to receive a data stream from a physical medium attachment layer at a line rate, where the data stream is a data stream on which 8-bit/10-bit encoding has been performed, and perform serial-to-parallel conversion on the received data stream;

an 8-bit/10-bit decoder, configured to perform 8-bit/10-bit decoding on the received data stream, and output the data stream on which the 8-bit/10-bit decoding has been performed;

a 32-bit to 34-bit encoder, configured to perform 32-bit to 34-bit encoding on the output data stream on which the 8-bit/10-bit decoding has been performed, and output the data stream on which the 32-bit to 34-bit encoding has been performed;

a forward error correction encoder, configured to perform forward error correction encoding on the output data stream on which the 32-bit to 34-bit encoding has been performed, and output the data stream on which the forward error correction encoding has been performed;

a first bit width converter, configured to perform bit width conversion of 34-bit/10-bit on the output data stream on which the forward error correction encoding has been performed; and a second interface unit, configured to send the data stream on which the bit width conversion has been performed to a physical medium dependent layer at the line rate.

With reference to the third aspect, in a first possible implementation manner of the third aspect, the 32-bit to 34-bit encoder further includes:

a first receiving unit, configured to sequentially and consecutively receive the data stream on which the 8-bit/10-bit decoding has been performed, to form four data blocks, where any one of the data blocks is a first control character block or a data character block, and any first control character block or any data character block is an 8-bit binary code; and a first determining unit, configured to determine whether a first control character block exists among the four data blocks.

With reference to the third aspect or the first possible implementation manner of the third aspect, in a second possible implementation manner, the 32-bit to 34-bit encoder further includes:

a first processing unit, configured to: if no first control character block exists among the four data blocks, add a first synchronization head to a header of a first data block among the four data blocks, and output the data blocks to which the first synchronization head is added, where the first data block is an 8-bit binary code input first, the first synchronization head includes a 2-bit first identifier, and the first identifier is used to identify that the data blocks are all data character blocks.

With reference to the third aspect, the first possible implementation manner of the third aspect, or the second possible implementation manner of the third aspect, in a third possible implementation manner of the third aspect, the 32-bit to 34-bit encoder further includes a second processing unit, and the second processing unit specifically includes:

a synchronization head generating unit, configured to: if at least one first control character block exists among the four data blocks, add a second synchronization head to a header of a first data block among the four data blocks, where the first data block is an 8-bit binary code input first, the second synchronization head includes a 2-bit second identifier, and the second identifier is used to identify that at least one first control character block exists among the data blocks;

a mapping code generating unit, configured to generate, according to a quantity of first control character blocks among the four data blocks and a location of the first control block among the data blocks, a 4-bit control character block location mapping code, and set the control character block location mapping code, in a location after the second synchronization head and closely adjacent to the second synchronization head;

a first control character block converting unit, configured to correspondingly convert the first control character block among the four data blocks into a 4-bit second control character block; and a first outputting unit, configured to output the processed data blocks, where the processed data blocks include the second synchronization head, the control character block location mapping code, and the second control character block that is obtained after the conversion, or the processed data blocks include the second synchronization head, the control character block location mapping code, the second control character block that is obtained after the conversion, and the data character block.

With reference to the third aspect, the first possible implementation manner of the third aspect, the second possible implementation manner of the third aspect, or the third possible implementation manner of the third aspect, in a fourth possible implementation manner of the third aspect, the first outputting unit is specifically configured to: if the four data blocks further include at least one data character block, perform no processing on the data character block among the four data blocks, and retain the data character block among the data blocks; and output the processed data blocks, where the processed data blocks include the second synchronization head, the control character block location mapping code, the second control character block that is obtained after the conversion, and a data block of the data character block.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the first outputting unit is further configured to determine whether a quantity of bits that are included in the output processed data blocks is 34; and if the quantity of the bits that are included in the output processed data blocks is less than 34, add a random number to a tail of the output processed data blocks until the quantity of the bits of the output processed data blocks becomes 34, where the random number is a randomly-generated binary code.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner of the third aspect, the optical network device further includes:

a first synchronizing unit, configured to synchronize the data stream on which the 8-bit/10-bit encoding has been performed.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner of the third aspect, the optical network device further includes: a scrambler, configured to scramble the data stream except the first synchronization head or the second synchronization head in the data stream on which the 32-bit to 34-bit encoding has been performed.

According to a fourth aspect, the present disclosure provides an optical network device, where the optical network device includes:

a third interface unit, configured to receive a data stream from a physical medium dependent layer at a line rate, where the data stream is a data stream on which 32-bit to 34-bit encoding has been performed;

a second bit width converter, configured to perform bit width conversion of 10-bit/34-bit on the received data stream;

a forward error correction decoder, configured to perform forward error correction decoding on the data stream on which the bit width conversion has been performed;

a 32-bit to 34-bit decoder, configured to perform 32-bit to 34-bit decoding on the data stream on which the forward error correction decoding has been performed;

an 8-bit/10-bit coder, configured to perform 8-bit/10-bit encoding on the data stream on which the 32-bit to 34-bit decoding has been performed; and a fourth interface unit, configured to send the data stream on which the 8-bit/10-bit encoding has been performed to a physical medium attachment layer.

With reference to the fourth aspect, in a first possible implementation manner of the fourth aspect, the 32-bit to 34-bit decoder includes:

a first parsing unit, configured to parse the data stream on which the forward error correction decoding has been performed, and output 51 data blocks, where any one of the data blocks is a second control character block or a data character block, any second control character block is a 4-bit binary code, and any data character block is an 8-bit binary code;

a second parsing unit, configured to parse any one of the data blocks, and obtain a synchronization head of the any one of the data blocks, where the synchronization head includes: a first synchronization head or a second synchronization head, the first synchronization head includes a 2-bit first identifier, the first identifier is used to identify that the data blocks are all data character blocks, the second synchronization head includes a 2-bit second identifier, and the second identifier is used to identify that at least one second control character block exists among the data blocks; and a second determining unit, configured to determine whether the synchronization head of the any one of the data blocks is a first synchronization head or a second synchronization head.

With reference to the fourth aspect or the first possible implementation manner of the fourth aspect, in a second possible implementation manner, the 32-bit to 34-bit decoder further includes:

a third processing unit, configured to: if the synchronization head is a first synchronization head, delete the first synchronization head, and output the data blocks from which the first synchronization head is deleted.

With reference to the fourth aspect, the first possible implementation manner of the fourth aspect, or the second possible implementation manner of the fourth aspect, in a third possible implementation manner of the fourth aspect, the 32-bit to 34-bit decoder further includes a fourth processing unit, and the fourth processing unit specifically includes:

a mapping code parsing unit, configured to: if the synchronization head is a second synchronization head, parse the data blocks, and obtain a 4-bit control character block location mapping code;

a second control character converting unit, configured to obtain a quantity of the second control character blocks among the data blocks and a location of the second control character block among the data blocks according to the control character block location mapping code; and correspondingly convert the second control character block among the data blocks into an 8-bit first control character block according to the quantity of the second control character blocks and the location of the second control character block among the data blocks;

a synchronization head deleting unit, configured to delete the second synchronization head and the control character block location mapping code from the data blocks, where the control character block location mapping code is in a location after the second synchronization head and closely adjacent to the second synchronization head; and a second outputting unit, configured to output the processed data blocks, where the processed data blocks include: the first control character block and/or the data character block, and any first control character block or any data character block is an 8-bit binary code.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the second outputting unit is specifically configured to: if the data blocks further include at least one data character block, perform no processing on the data character block among the data blocks, and retain the data character block; and output the processed data blocks, where the processed data blocks include: the first control character and the data character block.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, the optical network device further includes:

a second synchronizing unit, configured to synchronize the received data stream.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the optical network device further includes:

a descrambler, configured to descramble the data stream except the first synchronization head or the second synchronization head in the data stream on which the forward error correction decoding has been performed.

According to a fifth aspect, the present disclosure provides an optical network system, where the optical network system includes: the optical network device according to the third aspect and the optical network device according to the fourth aspect.

According to a sixth aspect, the present disclosure provides an optical network system, where the optical network system includes at least: an optical line terminal and an optical network unit, where the optical line terminal includes the optical network device according to the third aspect, and the optical network unit includes the optical network device according to the fourth aspect; or the optical network unit includes the optical network device according to the third aspect, and the optical line terminal includes the optical network device according to the fourth aspect.

A new encoding scheme is implemented by using the foregoing solutions: performing 32-bit to 34-bit encoding on a data stream on which 8-bit/10-bit decoding has been performed, performing forward error correction encoding on the data stream on which the 32-bit to 34-bit encoding has been performed, and sending the encoded data stream; or performing forward error correction decoding on a received data stream, and performing 32-bit to 34-bit decoding on the data stream on which the forward error correction decoding has been performed. In this way, a bandwidth resource of a line is saved; line monitoring can be implemented without interrupting a service, which is easy to implement and greatly improves various types of performance of a system.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

FIG. 3 is a schematic diagram of a 32-bit to 34-bit encoding rule;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
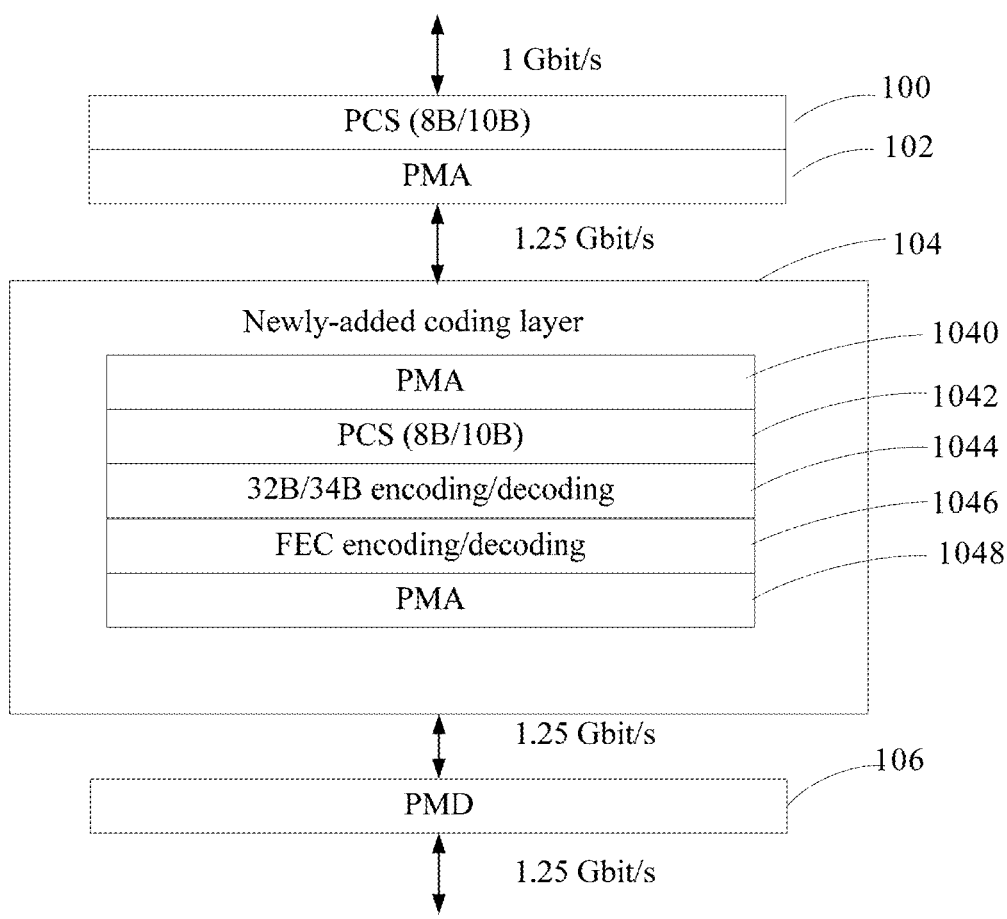
FIG. 1 is a schematic structural diagram of protocol layers of a communications system.

As shown in FIG. 1, FIG. 1 is a schematic structural diagram of protocol layers of a communications system according to an embodiment of the present disclosure.

In FIG. 1, a physical coding sub-layer (physical coding sub-layer, PCS) 100 receives a data stream at a specific rate, performs 8B/10B encoding on the received data stream, and outputs the encoded data stream. As illustrated in FIG. 1, the rate may be 1 Gbit/s at which receiving from an upper layer is performed, and after the 8b/10b encoding, the data stream is sent to a PMA layer 102 at a rate of 1.25 Gbit/s. The rate shown in FIG. 1 is not limited, and it may be 1 Gbit/s or another rate.

The physical medium attachment (PMA) layer 102 performs parallel-to-serial conversion on the data stream output by the PCS 100, and sends the converted data stream to a newly-added coding layer 104.

A physical medium dependent (PMD) layer 106 sends the received data stream to a physical line at a specific rate.

The coding layer 104 is newly added between the PMA layer 102 and the PMD layer 106, and the newly-added coding layer 104 includes: a PMA layer 1040, a PCS layer 1042, a 32b/34b encoding/decoding layer 1044, a forward error correction (forward error correction, FEC) encoding/decoding layer 1046, and a PMA layer 1048.

Functions of the layers of the newly-added coding layer 104 from top to bottom are described as follows:

the PMA layer 1040 receives a data stream from the PMA layer 102 at a line rate, performs serial-to-parallel conversion on the received data stream, and outputs the converted data stream to the PCS layer 1042 for processing, where the line rate may be 1.25 Gbit/s illustrated in the FIG. 1 or another rate, which is not limited herein;

the PCS layer 1042 performs 8-bit/10-bit decoding on the received data stream;

the 32B/34B encoding/decoding layer 1044 performs 32-bit to 34-bit encoding on the data stream on which the 8-bit/10-bit encoding has been performed;

the FEC encoding/decoding layer 1046 performs forward error correction encoding on the data stream on which the 32-bit to 34-bit encoding has been performed; and the PMA layer 1048 performs parallel-to-serial conversion on the data stream on which the forward error correction encoding has been performed, and sends the data stream on which the parallel-to-serial conversion has been performed to the physical medium dependent layer at the line rate.

Optionally, at the layer between the 32b/34b encoding/decoding layer 1044 and the FEC encoding/decoding layer 1046, a scrambling/descrambling layer, configured to scramble the data stream on which the 32-bit to 34-bit encoding has been performed, and input the scrambled data stream to the FEC encoding/decoding layer 1046 for FEC encoding.

Further, the scrambling/descrambling layer may be combined into the 32B/34B encoding/decoding layer 1044, or may be independently set between the 32B/34B encoding/decoding layer 1044 and the FEC encoding/decoding layer 1046.

Optionally, at the layer between the FEC encoding/decoding layer 1046 and the PMA layer 1048, wherein the process of the encoding/decoding method further comprises: performing bit width conversion of 34-bit/10-bit on the data stream on which the forward error correction encoding has been performed, and inputting the data stream on which the bit width conversion has been preformed to the PMA layer 1048 for processing.

Optionally, before the 8-bit/10-bit decoding is performed on the received data stream, synchronization is further performed on the received data stream.

Functions of the layers of the newly-added coding layer 104 from bottom to top are described as follows:

the PMA layer 1048 receives a data stream at a line rate, performs serial-to-parallel conversion on the received data stream, and outputs the converted data stream, where the data stream is a data stream on which 32-bit to 34-bit encoding has been performed;

the FEC encoding/decoding layer 1046 performs forward error correction decoding on the received data stream;

the 32B/34B encoding/decoding layer 1044 performs 32-bit to 34-bit decoding on the data stream on which the forward error correction decoding has been performed;

the PCS layer 1042 performs 8-bit/10-bit encoding on the data stream on which the 32-bit to 34-bit decoding has been performed; and the PMA 1040 sends the data stream on which the 8-bit/10-bit encoding has been performed to the PMA 102.

Optionally, the following is further included between the 32B/34B encoding/decoding layer 1044 and the FEC encoding/decoding layer 1046:

the scrambling/descrambling layer, configured to perform descrambling processing on the data stream on which the FEC decoding has been performed.

Further, the scrambling/descrambling layer may be combined into the 32B/34B encoding/decoding layer 1044, or may be independently set between the 32B/34B encoding/decoding layer 1044 and the FEC encoding/decoding layer 1046.

Optionally, after the PMA 1048 receives the data stream and before the data stream enters the FEC encoding/decoding layer 1046, synchronization processing is performed on the data stream.

Optionally, bit width conversion of 10-bit/34-bit is performed on the data stream on which the synchronization processing has been performed, and the data stream on which the bit width conversion has been performed is input to the FEC encoding/decoding layer 1046 for FEC decoding.

The structural diagram of the protocol layers shown in FIG. 1 may be applied on a terminal device or a central office device in a Gigabit Ethernet (GE) system or a WDMPON (wavelength division multiplexing passive optical network, WDMPON) system, and specifically, a newly-added coding layer 104 may be located between a PMA layer 102 and a PMD layer 106 of the terminal device or between a PMA layer 102 and a PMD layer 106 of the central office device.

Functions of the newly-added coding layer are mainly performing 32-bit to 34-bit encoding and decoding and performing an FEC check on a line. In this way, a new encoding scheme is used to save bandwidth and implement the FEC check on the line without interrupting service transmission.

Figure 2:
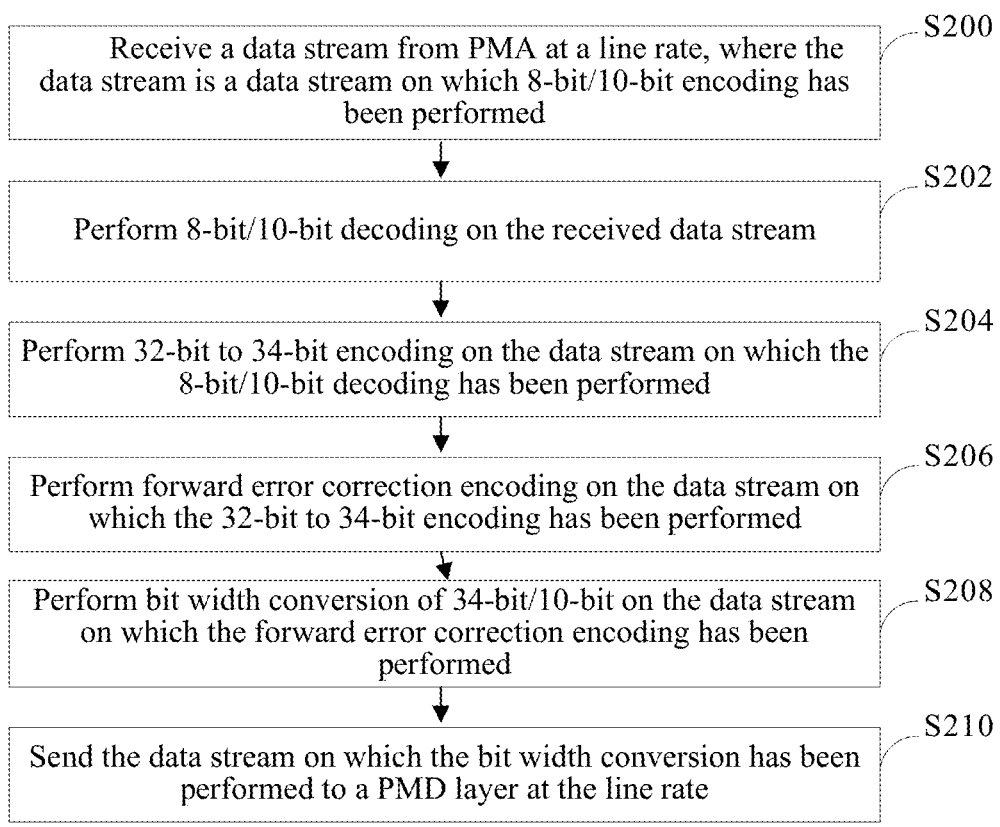
FIG. 2 is a flowchart of a communications method for an optical network system.

As shown in FIG. 2, FIG. 2 is a flowchart of a communications method for an optical network system. The communications method may be applied on a central office device or a terminal device of a GE system, or a central office device or a terminal device of a WDMPON system. Specifically, the communications method is as follows:

Step S200: Receive a data stream from PMA at a line rate, where the data stream is a data stream on which 8-bit/10-bit encoding has been performed.

Step S202: Perform 8-bit/10-bit decoding on the received data stream.

Step S204: Perform 32-bit to 34-bit encoding on the data stream on which the 8-bit/10-bit decoding has been performed.

Step S206: Perform forward error correction encoding on the data stream on which the 32-bit to 34-bit encoding has been performed.

Step S208: Perform bit width conversion of 34-bit/10-bit on the data stream on which the forward error correction encoding has been performed.

Step S210: Send the data stream on which the bit width conversion has been performed to a PMD layer at the line rate.

Optionally, before step S202, the method further includes:
synchronizing the data stream on which the 8-bit/10-bit encoding has been performed.

Optionally, after step S204, the method further includes:
scrambling the data stream except the first synchronization head or the second synchronization head in the data stream on which the 32-bit to 34-bit encoding has been performed.

Further, before the step of the performing 32-bit to 34-bit encoding on the data stream on which the 8-bit/10-bit decoding has been performed, the method further includes:
sequentially and consecutively receiving the data stream on which the 8-bit/10-bit decoding has been performed, to form four data blocks, where the data blocks include a first control character block and/or a data character block, and any first control character block or any data character block is an 8-bit binary code; and
determining whether a first control character block exists among the data blocks.

The performing 32-bit to 34-bit encoding on the data stream on which the 8-bit/10-bit decoding has been performed specifically includes:
if no first control character block exists among the data blocks, adding the first synchronization head to a header of a first data block among the data blocks, and outputting the data blocks to which the first synchronization head is added, where the first data block is an 8-bit binary code input first, the first synchronization head includes a 2-bit first identifier, and the first identifier is used to identify that the data blocks are all data character blocks;

if at least one first control character block exists among the data blocks, adding the second synchronization head to a header of a first data block among the data blocks, where the first data block is an 8-bit binary code input first, the second synchronization head includes a 2-bit second identifier, and the second identifier is used to identify that at least one first control character block exists among the data blocks;

generating, according to a quantity of first control character blocks among the data blocks and a location of the first control block among the data blocks, a 4-bit control character block location mapping code, and setting the control character block location mapping code, in a location after the second synchronization head and closely adjacent to the second synchronization head;

correspondingly converting the first control character block among the data blocks into a 4-bit second control character block; and outputting the processed data blocks, where the processed data blocks include the second synchronization head, the control character block location mapping code, and the second control character block that is obtained after the conversion, or the processed data blocks include the second synchronization head, the control character block location mapping code, the second control character block that is obtained after the conversion, and the data character block.

Further, if the data blocks further include at least one data character block, no processing is performed on the data character block among the data blocks, and the data character block among the data blocks is retained; and the processed data blocks are output, where the processed data blocks include the second synchronization head, the control character block location mapping code, the second control character block that is obtained after the conversion, and a data block of the data character block.

Further, the method further includes:
determining whether a quantity of bits that are included in the output processed data blocks is 34; and if the quantity of the bits that are included in the output processed data blocks is less than 34, adding a random number (which may be a randomly-padded binary code herein) to a tail of the output processed data blocks until the quantity of the bits of the output processed data blocks becomes 34, where the random number is a randomly-generated binary code or any binary code.

Used as an example, FIG. 3 is a schematic diagram of a 32-bit to 34-bit encoding rule. A specific process of performing 32-bit to 34-bit encoding on an input data stream is described by using a specific example.

Step 1: Sequentially and consecutively receive the data stream on which 8-bit/10-bit decoding has been performed, to form four data blocks, where the four data blocks have 32 bits in total, any one of the four data blocks may be a first control character block or a data character block, and any first control character block or data character block is an 8-bit binary code.

Step 2: Determine whether a first control character block or a data character block exists among the four received data blocks.

Step 3: If the four received data blocks are all data character blocks, and no control character block exists, add a first synchronization head (Synchronization Head, SH) to a header of a first data block among the four data blocks, directly map the four data character blocks to a data block payload without any conversion, and output the data blocks to which the first synchronization head is added.

The first data block is an 8-bit binary code input first. The first synchronization head is added to a location of the header of the first data block that is input first. The first synchronization head includes a 2-bit first identifier, and the first identifier is used to identify that the data blocks are all data character blocks.

As shown in FIG. 3, the sequentially received data blocks are D0D1D2D3, where each letter represents an 8-bit data character, for example, D0 indicates a first data character block input first and is an 8-bit binary code; the four input data blocks are all data character blocks, and no control character block exists. In this case, a first synchronization head "01" is added to a header of D0, and 01D0D1D2D3, 34-bit data blocks obtained after the first synchronization head is added, are output. For a specific process, refer to FIG. 4.

Figures 4, 5:
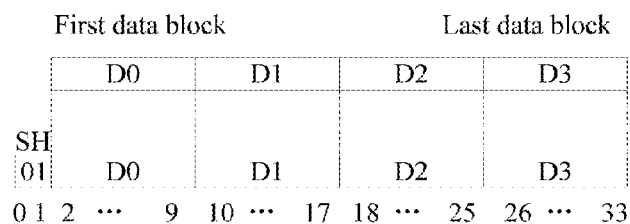
FIG. 4 is a schematic diagram of specific 32-bit to 34-bit encoding.
FIG. 5 is a schematic diagram of a control character block conversion table.

FIG. 4 shows four sequentially-input data blocks D0D1D2D3, where D0 is a data block input first. Herein, the first data block input first is the most significant eight bits, and data block D3 input last is the least significant eight bits; the first data block input first may also be defined as the least significant eight bits, and data block D3 input last may also be defined as the most significant eight bits. The first synchronization head "01" (a 2-bit binary code) is added to a header of the first data block input first (that is, a first data character block), and a 34-bit data stream 01D0D1D2D3 is output. In this way, the input 32-bit data stream is converted into the output 34-bit data stream by using the encoding scheme. The first synchronization head "01" is only an example. A specific combination form of the 2-bit binary code is not limited as long as it is set that the 2-bit binary code is capable of identifying that the data stream is all data character blocks.

Step 4: If at least one first control character block exists among the four data blocks, add a second synchronization head to the header of the first data block among the four data blocks, where the second synchronization head includes a 2-bit second identifier, and the second identifier is used to identify that at least one first control character block exists among the data blocks.

Step 5: Generate, according to a quantity of first control character blocks among the four data blocks and a location of the first control block among the data blocks, a 4-bit control character block location mapping code (the "mapping code" in FIG. 3 is the "control character block location mapping code" herein), and set the control character block location mapping code, in a location after the second synchronization head and closely adjacent to the second synchronization head.

Step 6: Correspondingly convert the first control character block among the four data blocks into a 4-bit second control character block.

Step 7: Output the processed data blocks, where the processed data blocks include the second synchronization head, the control character block location mapping code, and the second control character block that is obtained after the conversion, or the processed data blocks include the second synchronization head, the control character block location mapping code, the second control character block that is obtained after the conversion, and the data character block.

For details, refer to FIG. 3. Four data blocks C0D1D2D3 are input, where letter C represents an 8-bit first control character block, and D represents an 8-bit data character block. In this case, one first control character block C0 and three data character blocks D1, D2, and D3 exist among the four input data blocks. A specific process of performing 32-bit to 34-bit coding on an input data stream including at least one control character block is as follows:

Firstly, a second synchronization head "10" is added to a header of a first data block (the header of the first data block is specifically the first binary bit among consecutively-input binary bits) among the four input data blocks, that is, "10" is added before C0.

Secondly, one first control character block "C0" exists among the four data blocks, and C0 is in a location of the first data block among the four data blocks, that is, C0 is a data block input first. In this case, a 4-bit control character block location mapping code "1000" is generated according to C0, where "1" in "1000" represents that the first control character is the first data block among the four data blocks, and the other three data blocks are data character blocks. In addition, "1000" is set in a location after the second synchronization head "10" and before the first data block.

Then the 8-bit first control character block "C0" among the data blocks is converted into a 4-bit second control character block K0, where K0 represents the first second control character block, and each character K represents a 4-bit binary code. A specific conversion process is as follows:

A control character block conversion table shown in FIG. 5 is searched according to the input first control character block "C0", and a corresponding 4-bit second control character is output in a location of the corresponding data block. For example, "C0" is "000 11100", and a 4-bit second control character block "0000" obtained after the conversion is correspondingly output according to a result of searching the control character block conversion table shown in FIG. 5. In FIG. 3, the second control character obtained after the conversion is indicated by K0.

In addition, a correspondence between a first control character block and a second control character block shown in FIG. 5 may vary and is not limited to the correspondence shown in the table, as long as the 4-bit second control character block obtained after the conversion is capable of uniquely identifying an 8-bit first control character block. This is because there are 12 types of first control character blocks currently, and a 4-bit binary code may represent 16 types of control characters.

Finally, the data character blocks among the four data blocks are not processed and are directly mapped to corresponding locations of the data blocks that need to be output. The 34-bit data blocks finally output are "10 1000 K0D1D2D3", where "10" identifies that a first control character block exists among the four input data blocks, "1000" identifies that one first control character block exists and is the first data block among the four data blocks, "K0" is the second control character block obtained after the 8-bit first control character block "C0" is converted, and "D1D2D3" are the three character blocks.

Figure 6:
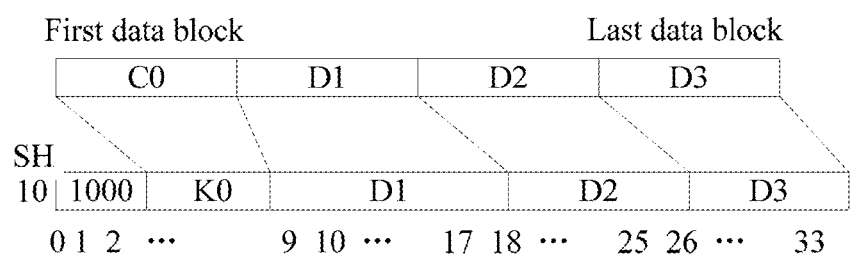
FIG. 6 is another schematic diagram of specific 32-bit to 34-bit encoding.

The conversion process may be further described by using FIG. 6. As shown in FIG. 6, the input data blocks are "C0D1D2D3"; after the 32-bit to 34-bit encoding, the second synchronization head "10" and the control character block location mapping code "1000" are added before C0, the first control character "C0" is converted to the second control character "K0", and the output encoded data stream is "10 1000 K0D1D2D3".

It should be noted that if only one control character block exists among the input data blocks, and the others are all data character blocks, processing is performed in the manner shown in FIG. 6. If both a control character block and a data character block exist among the input data blocks, and a quantity of control character blocks is at least 2, after the 32-bit to 34-bit encoding, it may be obtained by calculating that a quantity of bits of the output data blocks is less than 34. Therefore, it needs to be further determined whether the quantity of the bits that are included in the encoded data stream is 34; and if the quantity of the bits that are included in the output processed data blocks or data stream is less than 34, a random number is added to a tail of a last data block among the output data blocks or in the output data stream until the quantity of the bits of the output processed data blocks becomes 34, where the random number is a randomly-generated binary code or any binary code.

The following is an example for description.

Figure 7:
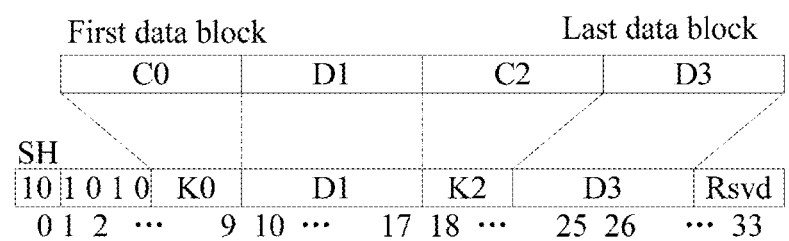
FIG. 7 is another schematic diagram of specific 32-bit to 34-bit encoding.

With reference to FIG. 3, FIG. 5, and FIG. 7, as shown in FIG. 3, if sequentially-input data blocks are "C0D1C2D3", the second synchronization head SH "10" and a control character block location mapping code "1010" are sequentially added to a header of a first data block input first. Then, by searching the control character block conversion table in FIG. 5, an 8-bit first control character block "C0" is converted into a corresponding 4-bit second control character block "K0" (as shown in FIG. 5, if "C0" is "001 11100", after the control character conversion table is searched, the output second control character block "K0" is "0001", where "K0" herein represents the 4-bit second control character block), and an 8-bit first control character block "C2" is converted into a corresponding 4-bit second control character block "K2". Data character blocks "D1" and "D3" are not modified. After the 32-bit to 34-bit encoding, output data blocks are "10 1010 K0D1K2D3", as shown in FIG. 7. It is obtained by calculating that the output data blocks have only 32 bits, and therefore, a 4-bit random number needs to be added to a tail of a last data block, that is, a 4-bit binary random number is randomly added in the location of "Rsvd". Optimally, it is better to try to avoid using a random number of an all "0" or all "1" combination, a combination of alternate "0" and "1" can be used, or a binary code is randomly padded.

Figure 8:
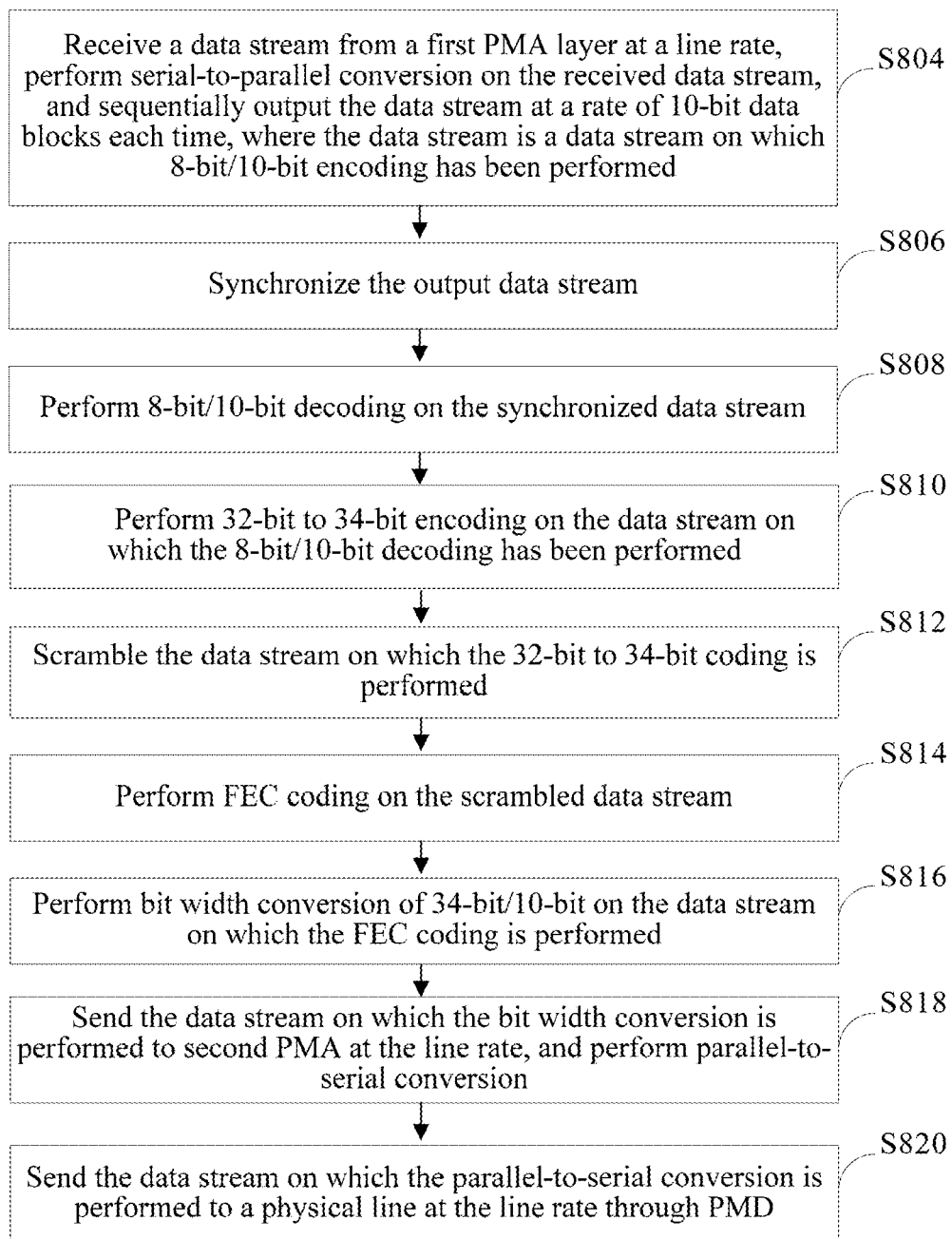
FIG. 8 is a specific flowchart of a communications method for an optical network system.

As shown in FIG. 8, FIG. 8 is a specific flowchart of a communications method for an optical network system.

Step S804: Receive a data stream from a first PMA layer at a line rate, perform serial-to-parallel conversion on the received data stream, and sequentially output the data stream at a rate of 10-bit data blocks each time, where the data stream is a data stream on which 8-bit/10-bit encoding has been performed.

Step S806: Synchronize the output data stream.

Step S808: Perform 8-bit/10-bit decoding on the synchronized data stream.

Step S810: Perform 32-bit to 34-bit encoding on the data stream on which the 8-bit/10-bit decoding has been performed.

Step S812: Scramble the data stream on which the 32-bit to 34-bit encoding has been performed.

Step S814: Perform FEC encoding on the scrambled data stream.

Step S816: Perform bit width conversion of 34-bit/10-bit on the data stream on which the FEC encoding has been performed.

Step S818: Send the data stream on which the bit width conversion has been performed to second PMA at the line rate, and perform parallel-to-serial conversion.

Step S820: Send the data stream on which the parallel-to-serial conversion has been performed to a physical line at the line rate through PMD.

Figure 9:
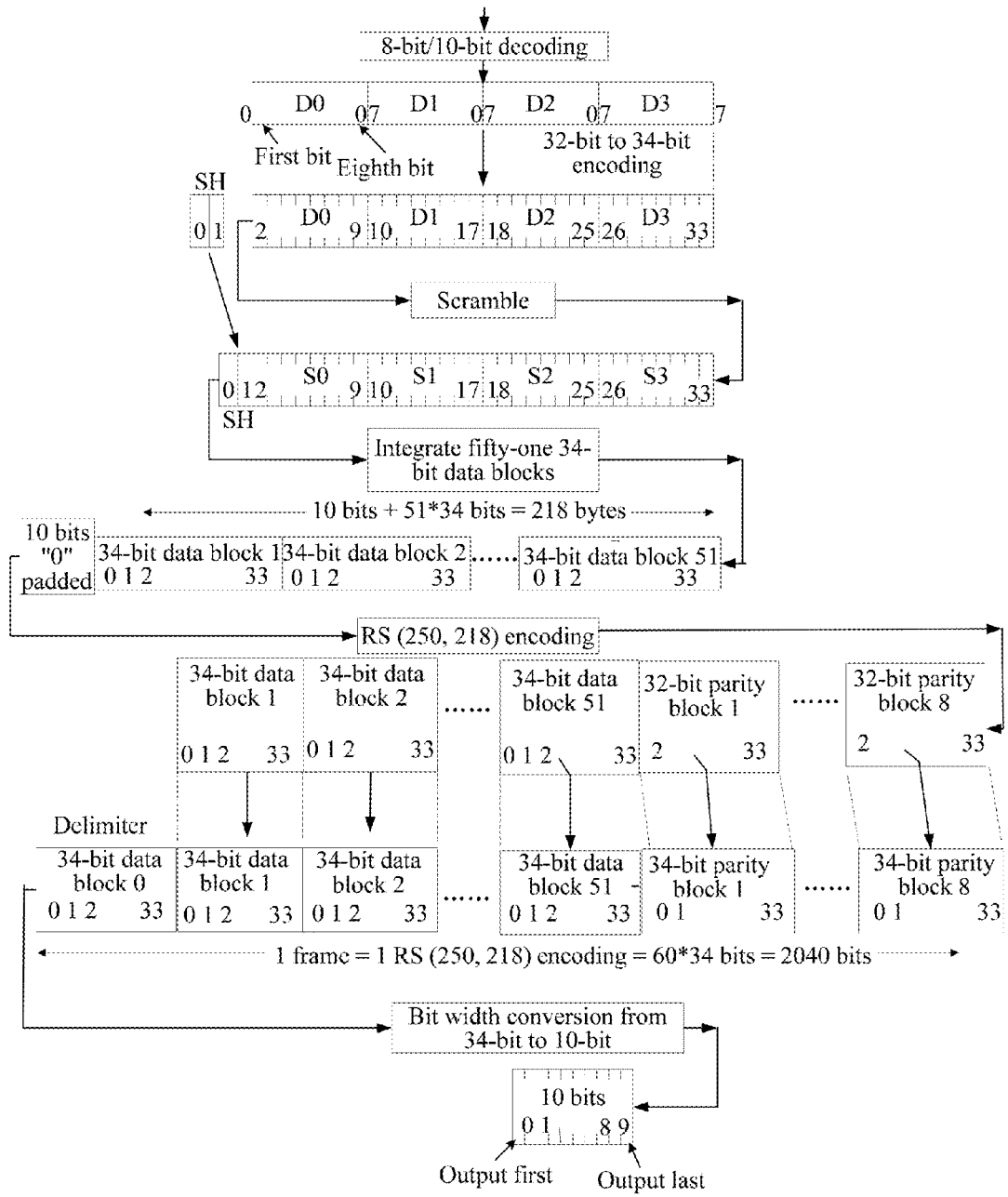
FIG. 9 is a schematic diagram of specific encoding of a newly-added code block.

As shown in FIG. 9, FIG. 9 is a schematic diagram of specific encoding of a newly-added code block. Detailed step descriptions of steps S810-S818 are as follows:

Step S900: Receive a data stream on which 8-bit/10-bit decoding has been performed, consecutively receive four 8-bit binary codes, and output "D0D1D2D3", where any letter D represents an 8-bit data character block, the data stream includes four data blocks, and the four input data blocks are all 8-bit data character blocks; add, according to the encoding rule, a first synchronization head SH, for example "01" (as long as a value of the first synchronization head can be distinguished from a value of a second synchronization head, and the first synchronization head and the second synchronization head are identified separately), before a first data block "D0", that is, before a first bit of "D0", where the first synchronization head identifies that the data stream is all data character blocks; and output "10 D0D1D2D3".

S902: Scramble the output 34-bit "10 D0D1D2D3", where data blocks except the first synchronization head or the second synchronization head are scrambled, for example, the first synchronization head "10" is not scrambled, and only data blocks "D0D1D2D3" are scrambled, the first synchronization head "10" is added to a header of a first data block among the scrambled data blocks during outputting, and a data stream finally output is "10 S0S1S2S3".

S904. Consecutively receive fifty-one 34-bit scrambled data blocks, and pad a header of a first 34-bit scrambled data block with 10 bits of "0", that is, "0000000000", to form a 218-byte data stream.

S906. Perform Reed-Solomon (RS) (250-byte, 218-byte) encoding on the input 218-byte data stream, and output a 250-byte data stream. Specifically, eight 32-bit parity blocks are added to a tail of the fifty-one 34-bit data. With the 10 bits padded previously, data of 2000 bits, that is, 250 bytes, is output. The RS (250-byte, 218-byte) encoding is a type of FEC encoding, and another FEC encoding scheme may also be selected. However, selecting the RS (250-byte, 218-byte) encoding is an optimal embodiment herein. In addition, it can be seen from the formation process that the output data of 2000 bits, that is, 250 bytes, includes: the fifty-one 34-bit data blocks, the eight 32-bit parity blocks, and the ten "0" padded during the encoding, where the fifty-one 34-bit data blocks are payload data.

S908. Delete the 10 padded bits from the output 250 bytes, add one 34-bit data block to a header of the output data as a delimiter, and add a 2-bit random number (or any binary code) to a header of any one of the eight 32-bit parity blocks to form eight 34-bit parity blocks, where sixty 34-bit data blocks, that is, 2040 bits in total, are finally formed. It can be seen from the described formation process that the sixty 34-bit data blocks include: one 34-bit delimiter, the fifty-one 34-bit data blocks as the payload data, and the eight 34-bit parity blocks.

S910. Perform bit width conversion from 34-bit/10-bit on the sixty 34-bit data streams, and output the data streams on which the bit width conversion has been performed, which is specifically performing the bit width conversion on each of the 34-bit data blocks, that is, converting the sixty 34-bit data streams into two-hundred-four 10-bit data streams, and outputting the data streams.

This embodiment of the present disclosure provides a communications method for an optical network system. The communications method may be applied in a GE system or a WDMPON system, to resolve a problem that a system overhead is high and a line cannot be detected due to an existing encoding scheme of the optical network system. Adopting a new encoding scheme without changing a line rate reduces the system overhead and implements line detection, which is easy to implement and greatly improves various types of performance of the system.

Figure 10:
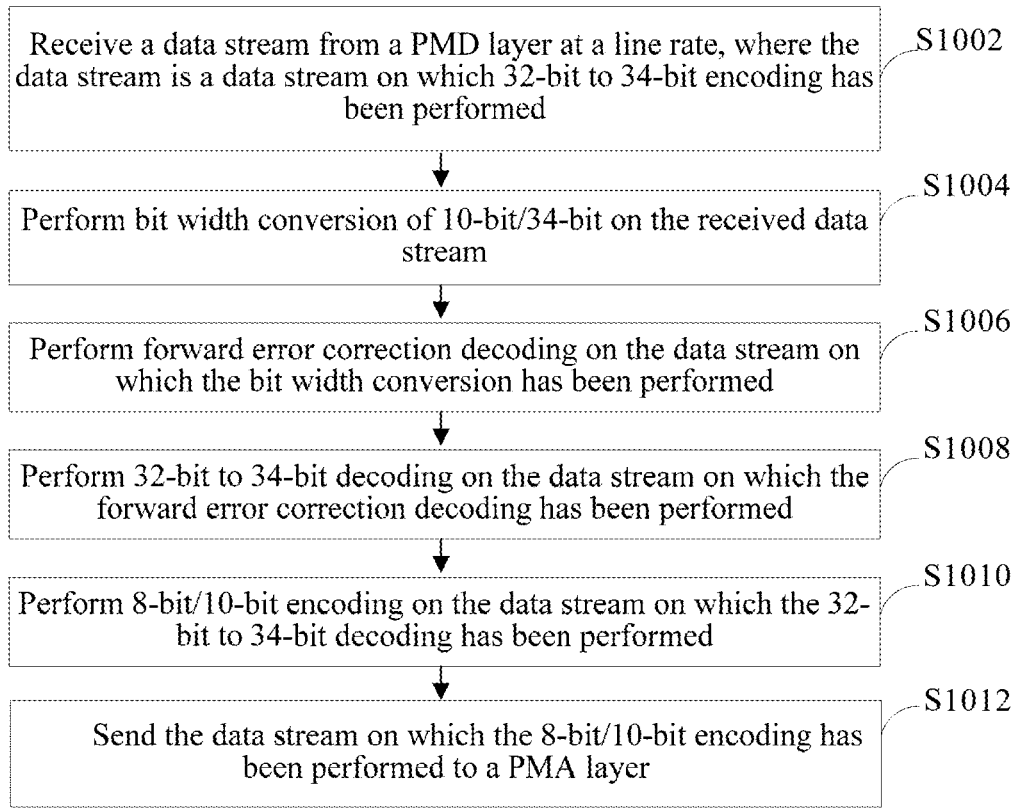
FIG. 10 illustrates another communications method for an optical network system.

An embodiment of the present disclosure further provides another communications method for an optical network system, as shown in FIG. 10.

Step S1002: Receive a data stream from a PMD layer at a line rate, where the data stream is a data stream on which 32-bit to 34-bit encoding has been performed.

Step S1004: Perform bit width conversion of 10-bit/34-bit on the received data stream.

Step S1006: Perform forward error correction decoding on the data stream on which the bit width conversion has been performed.

Step S1008: Perform 32-bit to 34-bit decoding on the data stream on which the forward error correction decoding has been performed.

Step S1010: Perform 8-bit/10-bit encoding on the data stream on which the 32-bit to 34-bit decoding has been performed.

Step S1012: Send the data stream on which the 8-bit/10-bit encoding has been performed to a PMA layer.

Optionally, before step S1004, the method further includes: synchronizing the received data stream.

Optionally, before step S1008, the method further includes: descrambling the data stream except the first synchronization head or the second synchronization head in the data stream on which the forward error correction decoding has been performed.

Further, before step S1008, the method further includes:

parsing the data stream on which the forward error correction decoding has been performed, and outputting 51 data blocks, where any one of the data blocks is a second control character block or a data character block, any second control character block is a 4-bit binary code, and any data character block is an 8-bit binary code;

parsing any one of the data blocks, and obtaining a synchronization head of the any one of the data blocks, where the synchronization head includes: a first synchronization head or a second synchronization head, the first synchronization head includes a 2-bit first identifier, the first identifier is used to identify that the data blocks are all data character blocks, the second synchronization head includes a 2-bit second identifier, and the second identifier is used to identify that at least one first control character block exists among the data blocks; and determining whether the synchronization head of the any one of the data blocks is a first synchronization head or a second synchronization head.

Further, if the synchronization head is a first synchronization head, the first synchronization head is deleted, and the data blocks from which the first synchronization head is deleted are output.

Further, if the synchronization head is a second synchronization head, the data blocks are parsed, and a 4-bit control character block location mapping code is obtained;

a quantity of the second control character blocks among the data blocks and a location of the second control character block among the data blocks are obtained according to the control character block location mapping code;

the second control character block among the data blocks is correspondingly converted into an 8-bit first control character block according to the quantity of the second control character blocks and the location of the second control character block among the data blocks;

the second synchronization head and the control character block location mapping code are deleted from the data blocks, where the control character block location mapping code is in a location after the second synchronization head and closely adjacent to the second synchronization head; and;

the processed data blocks are output, where the processed data blocks include: the first control character block and/or the data character block, and any first control character block or any data character block is an 8-bit binary code.

Further, if the received data blocks further include at least one data character block, no processing is performed on the data character block among the data blocks, and the data character block is retained; and the processed data blocks are output, where the processed data blocks include: the first control character and the data character block.

Figure 11:
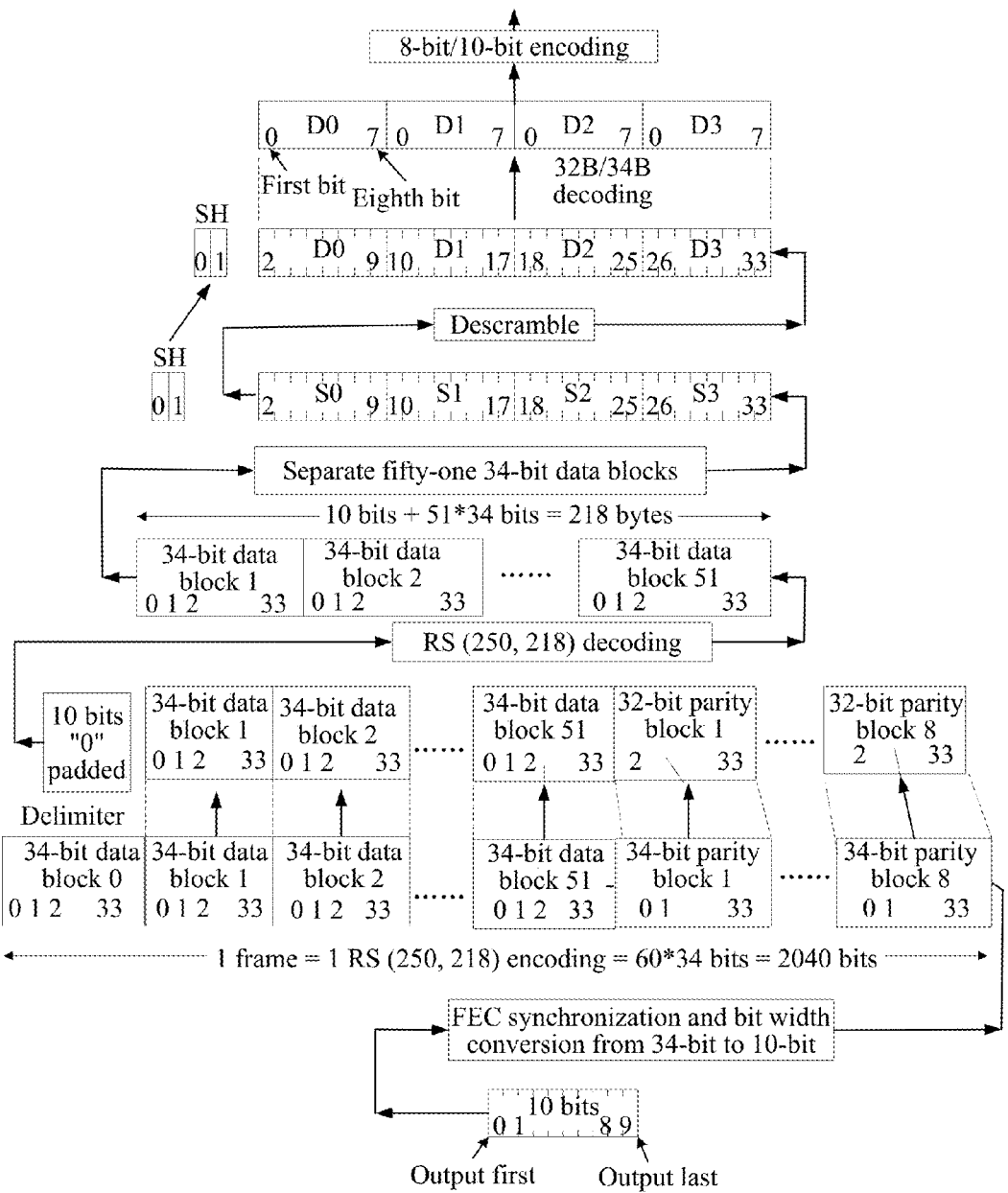
FIG. 11 is a schematic diagram of specific encoding of 32-bit to 34-bit decoding.

Specifically, a process of decoding the data stream received from the PMD is shown in FIG. 11. FIG. 11 is a schematic diagram of specific encoding of 32-bit to 34-bit decoding. With reference to FIG. 11, the decoding process is as follows:

Step S1102: Receive a data stream from a PMD, where the data stream is a data stream on which 32-bit to 34-bit encoding has been performed.

Step S1104: Perform parallel-to-serial conversion on the received data stream, receive a 10-bit data stream each time, and perform synchronization processing on the received data stream.

Step S1106: Perform bit width conversion from 10-bit to 34-bit on the data stream on which the synchronization processing has been performed, so that a 34-bit data stream is input each time.

Step S1108: After sixty 34-bit data blocks are consecutively received, perform FEC decoding on the sixty 34-bit data blocks, and output the data blocks on which the FEC decoding has been performed.

A specific FEC decoding process is as follows:

The sixty input 34-bit data blocks include: one 34-bit delimiter, fifty-one 34-bit data blocks (the fifty-one 34-bit data blocks are payload data), and eight 34-bit parity blocks.

A first data block among the sixty input 34-bit data blocks is deleted, where the first data block is the 34-bit delimiter; 10 bits of "0", that is, "0000000000" is added before the first data block; then the last eight 34-bit parity blocks are converted into eight 32-bit parity blocks (two bits input first are deleted from each of the 34-bit parity blocks, where the two bits are padded with a random number or any binary code); and "0000000000+fifty-one 34-bit data blocks+eight 32-bit parity blocks" are output. RS (250-byte, 218-byte) decoding is performed on the output data blocks, and the fifty-one 34-bit data blocks on which the RS decoding has been performed are output. Then the fifty-one 34-bit data blocks are separated, and processing is performed on the basis that every 34 bits are one data block. Any one of the separated 34-bit data blocks is parsed, and it is obtained after the parsing that a 2-bit synchronization head SH in a header of the data block is "01". A 32-bit data block, for example, "01 S0S1S2S3" in FIG. 11, which is obtained after the 2-bit synchronization head is deleted, is descrambled, and a 32-bit descrambled data block, for example, "D0D1D2D3" in FIG. 11, is output. The synchronization head is added to a header of a first data block D0 of the 32-bit descrambled data block "D0D1D2D3", a data block "01 D0D1D2D3" obtained after the synchronization head is added is output, 32-bit to 34-bit decoding is performed on the output data, and data "D0D1D2D3" obtained after the 32-bit to 34-bit decoding is output. Finally, 8-bit/10-bit encoding is performed on the data "D0D1D2D3" obtained after the 32-bit to 34-bit decoding, and a data block obtained after the 8-bit/10-bit encoding is output.

A decoding rule is an inverse process of the 32-bit to 34-bit encoding process, and details are as follows:

Example 1

FIG. 4 is used as an example. The input 34-bit data stream is parsed, and two bits input first in the input data stream are determined, where the two bits are a synchronization head. The synchronization head includes: a first synchronization head or a second synchronization head; the first synchronization head includes a 2-bit first identifier, and the first identifier is used to identify that the input data blocks are all data character blocks; and the second synchronization head includes a 2-bit second identifier, and the second identifier is used to identify that at least one second control character block exists among the input data blocks.

If it is obtained after the parsing that the synchronization head is "01", it is determined that the synchronization head is the first identifier, that is, the input data blocks are all data character blocks (it is predetermined that the first identifier "01" identifies that the data blocks are all data character blocks, and "10" identifies that at least one second control character block exists among the data blocks).

Further, the first synchronization head "01" is deleted, the remaining four data character blocks are output directly without processing, and data blocks finally output are 32-bit "D0D1D2D3".

Example 2

FIG. 6 is used as an example. The input 34-bit data stream is parsed, and a value of a synchronization head of the data stream is obtained. If the value of the SH is "10", it is learned, according to preset values of the first identifier and the second identifier, that at least one second control character block exists in the input data stream, and the synchronization head is a second synchronization head.

Further, four bits after the second synchronization head "10" are parsed. If the four bits after the second synchronization head is a control character block location mapping code, for example, "1000", it may be learned, according to the "1000", that the first data block among the data blocks after the control character block location mapping code is a second control character block, and the remaining three data blocks are data character blocks.

Further, a data block is further parsed according to the parsing. If it is obtained after the parsing that the input data stream is "10 1000 K0D1D2D3", "K0" is further parsed. The control character block conversion table shown in FIG. 5 is searched, a 4-bit second control character block is input, an 8-bit first control character block "C0" is output after the table is searched, and the remaining three data character blocks are not converted. In this case, four 8-bit data blocks "C0D1D2D3" obtained after the conversion are output, and are 32 bits in total.

Example 3

FIG. 7 is used as an example. The input 34-bit data stream is parsed, a value of a synchronization head of the data stream is obtained, and it is assumed that the value of the SH is "10".

Further, four bits after the second synchronization head "10" are parsed. If the four bits after the second synchronization head are a control character block location mapping code, for example, "1010", it may be learned, according to the "1010", that a first data block among the data blocks after the control character block location mapping code is a second control character block, a third data block is also a second control character block, a second data block is a data character block, and a fourth data block is a data character block.

Further, it is learned, according to the control character block location mapping code, that at least two control character blocks exist in the input 34-bit data stream. In this case, a binary code randomly padded in the last four bits in the input data stream is learned according to the 32-bit to 34-bit encoding rule (2-bit second synchronization head+4-bit control character block location mapping code+4-bit second control character block+8-bit data character block+4-bit second control character block+8-bit data character block=30 bits, and the remaining four bits are the randomly-padded binary code). Herein, based on the analysis, the binary code randomly padded in the last four bits of the data blocks may be directly deleted, or the last randomly-padded binary code may not be further processed. This is because after the 4-bit second control character blocks are converted into 8-bit first control character blocks by searching the table, the randomly-padded binary code is automatically shielded, and a first control character obtained after the conversion and a data character are directly output.

Further, the first data block and the third data block are further parsed. If it is obtained after the parsing that the input data stream is "10 1010 K0D1K2D3", "K0" and "K2" are further parsed. The control character block conversion table shown in FIG. 5 is searched, the 4-bit second control character blocks are input, and 8-bit first control character blocks "C0" and "C2" are separately output by searching the table. The second data block and the fourth data block are data character blocks and are not converted; four 8-bit data blocks "C0D1D2D3" obtained after the conversion are finally output, and are 32 bits in total. In addition, a quantity of the second control character blocks among the input data blocks is at least two, and therefore the last few bits in the input data blocks are a randomly-padded binary code, which aims to ensure that the input data blocks have 34 bits. During the 32-bit to 34-bit decoding, the randomly-padded binary code may be ignored because the randomly-padded binary code is shielded after the 4-bit second control character blocks are converted into the 8-bit first control character blocks by searching the control character block conversion table.

This embodiment of the present disclosure provides another communications method for an optical network system. The communications method may be applied in a GE system or a WDMPON system, to resolve a problem that a system overhead is high and a line cannot be detected due to an existing decoding scheme of the optical network system. Adopting a new decoding scheme without changing a line rate reduces the system overhead and implements line detection, which is easy to implement and greatly improves various types of performance of the system.

Figure 12:
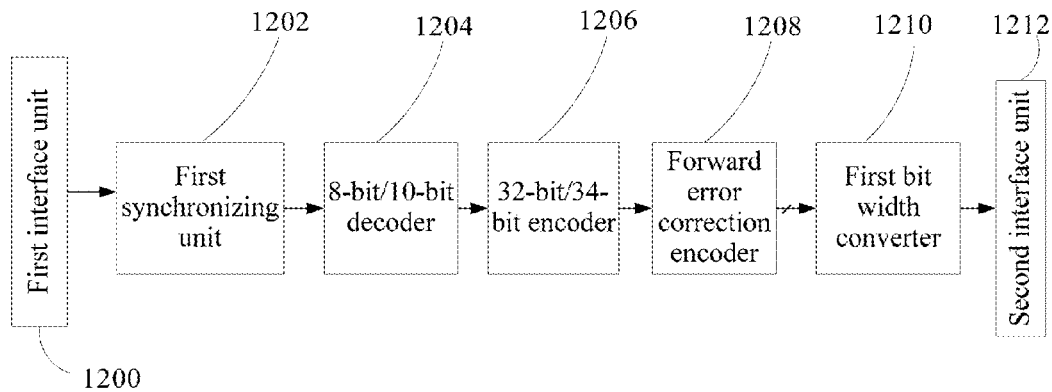
FIG. 12 is a schematic structural diagram of an optical network device.

An embodiment of the present disclosure further provides an optical network device, and as shown in FIG. 12, the optical network device includes:

a first interface unit 1200, configured to receive a data stream from a physical medium attachment layer at a line rate, where the data stream is a data stream on which 8-bit/10-bit encoding has been performed, and perform serial-to-parallel conversion on the received data stream;

an 8-bit/10-bit decoder 1204, configured to perform 8-bit/10-bit decoding on the received data stream, and output the data stream on which the 8-bit/10-bit decoding has been performed;

a 32-bit to 34-bit encoder 1206, configured to perform 32-bit to 34-bit encoding on the output data stream on which the 8-bit/10-bit decoding has been performed, and output the data stream on which the 32-bit to 34-bit encoding has been performed;

a forward error correction encoder 1208, configured to perform forward error correction encoding on the output data stream on which the 32-bit to 34-bit encoding has been performed, and output the data stream on which the forward error correction encoding has been performed;

a first bit width converter 1210, configured to perform bit width conversion of 34-bit/10-bit on the output data stream on which the forward error correction encoding has been performed; and a second interface unit 1212, configured to send the data stream on which the bit width conversion has been performed to a physical medium dependent layer at the line rate.

The optical network device further includes:

a first synchronizing unit 1202, configured to synchronize the data stream on which the 8-bit/10-bit encoding has been performed.

The optical network device further includes:

a scrambler, configured to scramble the data stream except the first synchronization head or the second synchronization head in the data stream on which the 32-bit to 34-bit encoding has been performed. The scrambler is not marked in FIG. 12. The scrambler may be an independent device located between the 32-bit/34-bit encoder 1206 and the forward error correction encoder 1208; or the scrambler may be integrated in the 32-bit/34-bit encoder 1206.

Figure 13:
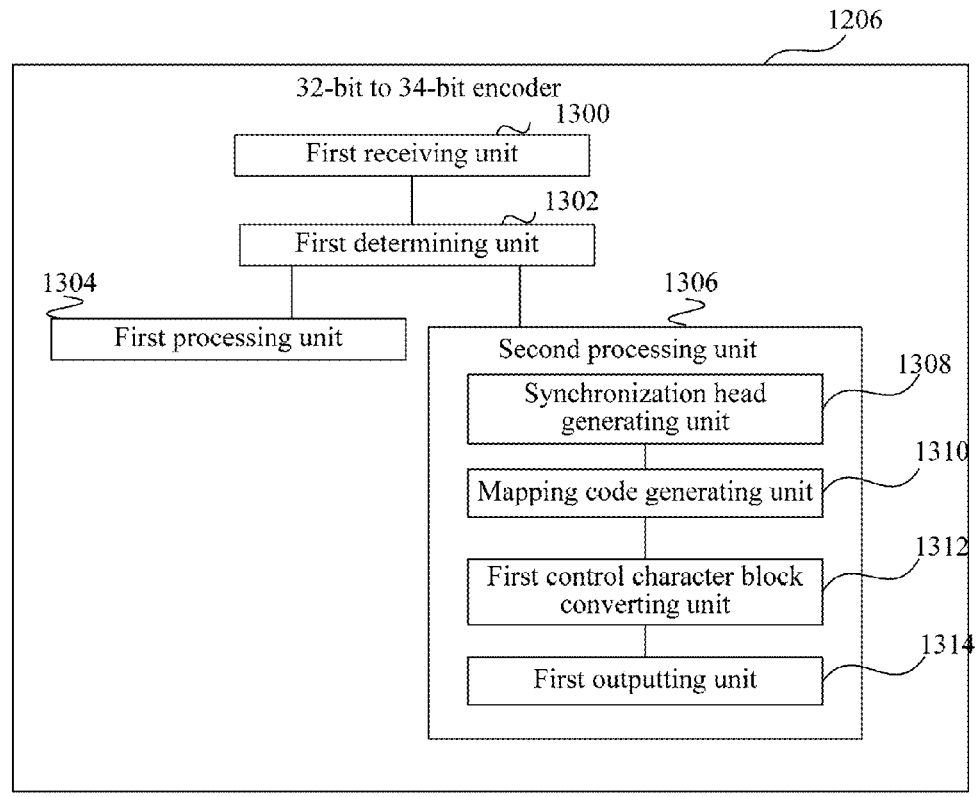
FIG. 13 is a schematic structural diagram of composition of a 32-bit to 34-bit encoder.

Further, as shown in FIG. 13, inner composition of the 32-bit to 34-bit encoder (that is, the 32-bit/34-bit encoder) 1206 in the optical network device specifically includes:

a first receiving unit 1300, configured to sequentially and consecutively receive the data stream on which the 8-bit/10-bit decoding has been performed, to form four data blocks, where any one of the data blocks is a first control character block or a data character block, and any first control character block or any data character block is an 8-bit binary code; and a first determining unit 1302, configured to determine whether a first control character block exists among the four data blocks.

The 32-bit to 34-bit encoder further includes:

a first processing unit 1304, configured to: if no first control character block exists among the four data blocks, add a first synchronization head to a header of a first data block among the four data blocks, and output the data blocks to which the first synchronization head is added, where the first data block is an 8-bit binary code input first, the first synchronization head includes a 2-bit first identifier, and the first identifier is used to identify that the data blocks are all data character blocks.

The 32-bit to 34-bit encoder 1206 further includes a second processing unit 1306, where the second processing unit 1306 specifically includes:

a synchronization head generating unit 1308, configured to; if at least one first control character block exists among the four data blocks, add a second synchronization head to a header of a first data block among the four data blocks, where the first data block is an 8-bit binary code input first, the second synchronization head includes a 2-bit second identifier, and the second identifier is used to identify that at least one first control character block exists among the data blocks;

a mapping code generating unit 1310, configured to generate, according to a quantity of first control character blocks among the four data blocks and a location of the first control block among the data blocks, a 4-bit control character block location mapping code, and set the control character block location mapping code, in a location after the second synchronization head and closely adjacent to the second synchronization head;

a first control character block converting unit 1312, configured to correspondingly convert the first control character block among the four data blocks into a 4-bit second control character block; and a first outputting unit 1314, configured to output the processed data blocks, where the processed data blocks include the second synchronization head, the control character block location mapping code, and the second control character block that is obtained after the conversion, or the processed data blocks include the second synchronization head, the control character block location mapping code, the second control character block that is obtained after the conversion, and the data character block.

A specific working principle of the 32-bit to 34-bit encoder is described as follows:

For details, refer to FIG. 3. Four data blocks C0D1D2D3 are input, where letter C represents an 8-bit first control character block, and D represents an 8-bit data character block. In this case, one first control character block C0 and three data character blocks D1, D2, and D3 exist among the four input data blocks. A specific process of 32-bit to 34-bit encoding on a data stream including at least one control character in an input data stream is as follows:

Firstly, a second synchronization head "10" is added to a header of a first data block (the header of the first data block is specifically a first binary bit input consecutively) among the four input data blocks, that is, "10" is added before C0.

Secondly, one first control character block "C0" exists among the four data blocks, and C0 is in a location of the first data block among the four data blocks, that is, C0 is a data block input first. In this case, a 4-bit control character block location mapping code "1000" is generated according to C0, where "1" in "1000" represents that the first control character is the first data block among the four data blocks, and the other three data blocks are data character blocks. In addition, "1000" is set in a location after the second synchronization head "10" and before the first data block.

Then the 8-bit first control character block "C0" among the data blocks is converted into a 4-bit second control character block K0, where K0 represents a first second control character block, and each character K represents a 4-bit binary code. A specific conversion process is as follows:

The control character block conversion table shown in FIG. 5 is searched according to the input first control character block "C0", and a corresponding 4-bit second control character is output in a location of the corresponding data block. For example, "C0" is "000 11100", and a 4-bit second control character block "0000" obtained after the conversion is correspondingly output by searching the control character block conversion table shown in FIG. 5. In FIG. 3, the second control character obtained after the conversion is indicated by K0.

In addition, the correspondence between a first control character block and a second control character block shown in FIG. 5 may vary and is not limited to the correspondence shown in the table, as long as the 4-bit second control character block obtained after the conversion is capable of uniquely identifying an 8-bit first control character block. This is because there are 12 types of first control character blocks currently, and a 4-bit binary code may represent 16 types of control characters.

Finally, the data character blocks among the four data blocks are not processed and are directly mapped to corresponding locations of the data blocks that need to be output. The 34-bit data blocks finally output are "10 1000 K0D1D2D3", where "10" identifies that a first control character block exists among the four input data blocks, "1000" identifies that one first control character block exists and is the first data block among the four data blocks, "K0" is the second control character block obtained after the 8-bit first control character block "C0" is converted, and "D1D2D3" are the three character blocks.

The conversion process may be further described by using FIG. 6. As shown in FIG. 6, the input data blocks are "C0D1D2D3". After the 32-bit to 34-bit encoding, the second synchronization head SH "10" and the control character block location mapping code "1000" are added before C0, the first control character "C0" is converted to the second control character "K0", and the output encoded data stream is "10 1000 K0D1D2D3".

It should be noted that if only one control character block exists among the input data blocks, and the others are all data character blocks, processing is performed in the manner shown in FIG. 6. If both a control character block and a data character block exist among the input data blocks, and a quantity of control character blocks is at least 2, after the 32-bit to 34-bit encoding, it may be obtained by calculating that a quantity of bits of the output data blocks is less than 34. Therefore, it needs to be further determined whether the quantity of the bits that are included in the encoded data stream is 34; and if the quantity of the bits that are included in the output processed data blocks or data stream is less than 34, a random number is added to a tail of a last data block among the output data blocks or in the output data stream until the quantity of the bits of the output processed data blocks becomes 34, where the random number is a randomly-generated binary code or any binary code.

According to the introduction to the function of each module in the optical network device, the optical network device provided in this embodiment of the present disclosure resolves a problem that a system overhead is high and a line cannot be detected due to an existing encoding scheme of the optical network system. Adopting a new encoding scheme without changing a line rate reduces the system overhead and implements line detection, which is easy to implement and greatly improves various types of performance of the system.

An embodiment of the present disclosure further provides another optical network device. For details, refer to FIG. 14.

Figure 14:
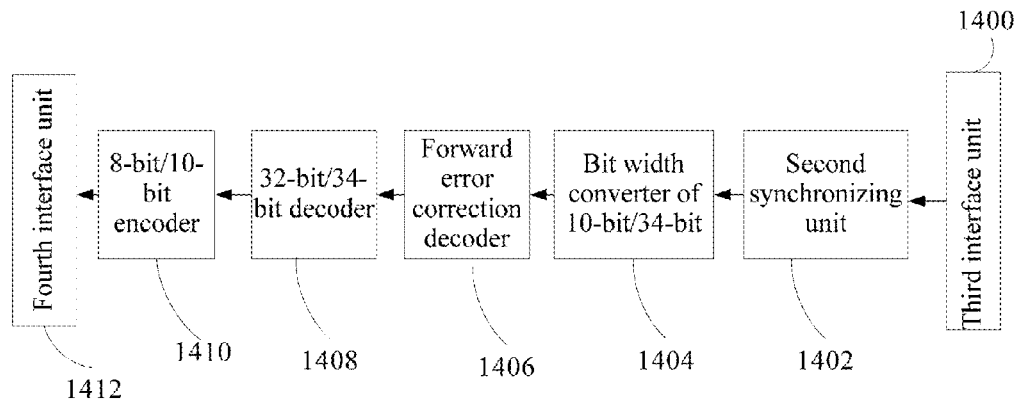
FIG. 14 is a schematic structural diagram of composition of another optical network device.

In FIG. 14, the another optical network device may include:

a third interface unit 1400, configured to receive a data stream from a physical medium dependent layer at a line rate, where the data stream is a data stream on which 32-bit to 34-bit encoding has been performed;

a second bit width converter 1404, configured to perform bit width conversion of 10-bit/34-bit on the received data stream;

a forward error correction decoder 1406, configured to perform forward error correction decoding on the data stream on which the bit width conversion has been performed;

a 32-bit to 34-bit decoder 1408, configured to perform 32-bit to 34-bit decoding on the data stream on which the forward error correction decoding has been performed;

an 8-bit/10-bit coder 1410, configured to perform 8-bit/10-bit encoding on the data stream on which the 32-bit to 34-bit decoding has been performed; and a fourth interface unit 1412, configured to send the data stream on which the 8-bit/10-bit encoding has been performed to a physical medium attachment layer.

Further, the optical network device further includes:

a second synchronizing unit 1402, configured to synchronize the received data stream.

Further, the optical network device further includes:

a descrambler, configured to descramble the data stream except the first synchronization head or the second synchronization head in the data stream on which the forward error correction decoding has been performed. The descrambler is not marked in FIG. 14. The scrambler may be an independent device located between the 32-bit/34-bit decoder 1408 and the forward error correction decoder 1406; or the scrambler may be integrated in the 32-bit/34-bit decoder 1408.

Figure 15:
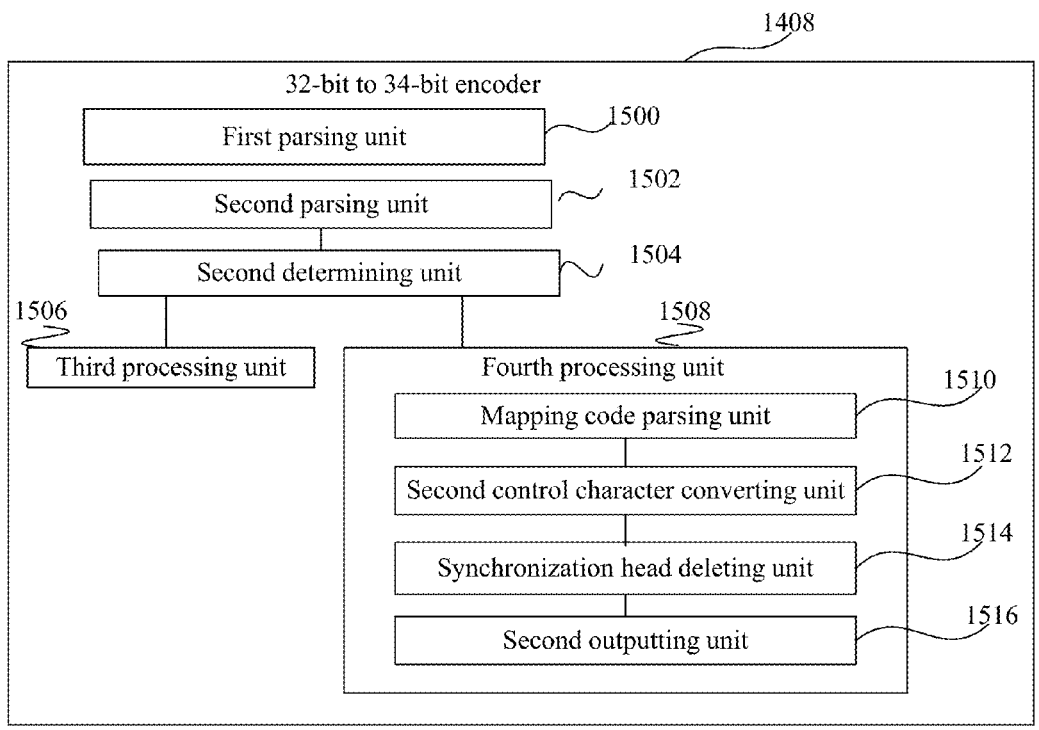
FIG. 15 is a schematic structural diagram of composition of a 32-bit to 34-bit decoder.

Specifically, as shown in FIG. 15, an inner composition structure of the 32-bit/34-bit decoder 1408 (that is, the 32-bit to 34-bit decoder 1408) includes:

a first parsing unit 1500, configured to parse the data stream on which the forward error correction decoding has been performed, and output 51 data blocks, where any one of the data blocks is a second control character block or a data character block, any second control character block is a 4-bit binary code, and any data character block is an 8-bit binary code;

a second parsing unit 1502, configured to parse any one of the data blocks, and obtain a synchronization head of the any one of the data blocks, where the synchronization head includes: a first synchronization head or a second synchronization head, the first synchronization head includes a 2-bit first identifier, the first identifier is used to identify that the data blocks are all data character blocks, the second synchronization head includes a 2-bit second identifier, and the second identifier is used to identify that at least one second control character block exists among the data blocks; and a second determining unit 1504, configured to determine whether the synchronization head of the any one of the data blocks is a first synchronization head or a second synchronization head.

Further, the 32-bit to 34-bit decoder further includes:

a third processing unit 1506, configured to: if the synchronization head is a first synchronization head, delete the first synchronization head, and output the data blocks from which the first synchronization head is deleted.

Further, the 32-bit to 34-bit decoder further includes a fourth processing unit 1508, where the fourth processing unit 1508 specifically includes:

a mapping code parsing unit 1510, configured to: if the synchronization head is a second synchronization head, parse the data blocks, and obtain a 4-bit control character block location mapping code;

a second control character converting unit 1512, configured to obtain a quantity of the second control character blocks among the data blocks and a location of the second control character block among the data blocks according to the control character block location mapping code; and correspondingly convert the second control character block among the data blocks into an 8-bit first control character block according to the quantity of the second control character blocks and the location of the second control character block among the data blocks;

a synchronization head deleting unit 1514, configured to delete the second synchronization head and the control character block location mapping code from the data blocks, where the control character block location mapping code is in a location after the second synchronization head and closely adjacent to the second synchronization head; and a second outputting unit 1516, configured to output the processed data blocks, where the processed data blocks include: the first control character block and/or the data character block, and any first control character block or any data character block is an 8-bit binary code.

Further, the second outputting unit 1516 is specifically configured to: if the data blocks further include at least one data character block, perform no processing on the data character block among the data blocks, and retain the data character block; and output the processed data blocks, where the processed data blocks include: the first control character and the data character block.

An inverse process of the 32-bit to 34-bit encoding process, that is, the 32-bit to 34-bit decoding process, is specifically as follows:

Example 1

FIG. 4 is used as an example. The input 34-bit data stream is parsed, and two bits input first in the input data stream are determined, where the two bits are a synchronization head. The synchronization head includes: a first synchronization head or a second synchronization head; the first synchronization head includes a 2-bit first identifier, and the first identifier is used to identify that the input data blocks are all data character blocks; and the second synchronization head includes a 2-bit second identifier, and the second identifier is used to identify that at least one second control character block exists among the input data blocks.

If it is obtained after the parsing that the synchronization head is "01", it is determined that the synchronization head is the first identifier, that is, the input data blocks are all data character blocks (it is predetermined that the first identifier "01" identifies that the data blocks are all data character blocks, and "10" identifies that at least one second control character block exists among the data blocks).

Further, the first synchronization head "01" is deleted, the remaining four data character blocks are output directly without processing, and data blocks finally output are 32-bit "D0D1D2D3".

Example 2

FIG. 6 is used as an example. The input 34-bit data stream is parsed, and a value of a synchronization head of the data stream is obtained. If the value of the SH is "10", it is learned, according to preset values of the first identifier and the second identifier, that at least one second control character block exists in the input data stream, and the synchronization head is a second synchronization head.

Further, four bits after the second synchronization head "10" are parsed. If the four bits after the second synchronization head is a control character block location mapping code, for example, "1000", it may be learned, according to the "1000", that the first data block among the data blocks after the control character block location mapping code is a second control character block, and the remaining three data blocks are data character blocks.

Further, a data block is further parsed according to the parsing. If it is obtained after the parsing that the input data stream is "10 1000 K0D1D2D3", "K0" is further parsed. The control character block conversion table shown in FIG. 5 is searched, a 4-bit second control character block is input, an 8-bit first control character block "C0" is output after the table is searched, and the remaining three data character blocks are not converted. In this case, four 8-bit data blocks "C0D1D2D3" obtained after the conversion are output, and are 32 bits in total.

Example 3

FIG. 7 is used as an example. The input 34-bit data stream is parsed, a value of a synchronization head of the data stream is obtained, and it is assumed that the value of the SH is "10".

Further, four bits after the second synchronization head "10" are parsed. If the four bits after the second synchronization head are a control character block location mapping code, for example, "1010", it may be learned, according to the "1010", that a first data block among the data blocks after the control character block location mapping code is a second control character block, a third data block is also a second control character block, a second data block is a data character block, and a fourth data block is a data character block.

Further, it is learned, according to the control character block location mapping code, that at least two control character blocks exist in the input 34-bit data stream. In this case, a binary code randomly padded in the last four bits in the input data stream is learned according to the 32-bit to 34-bit encoding rule (2-bit second synchronization head+4-bit control character block location mapping code+4-bit second control character block+8-bit data character block+4-bit second control character block+8-bit data character block=30 bits, and the remaining four bits are the randomly-padded binary code). Herein, based on the analysis, the binary code randomly padded in the last four bits of the data blocks may be directly deleted, or the last randomly-padded binary code may not be further processed. This is because after the 4-bit second control character blocks are converted into 8-bit first control character blocks by searching the table, the randomly-padded binary code is automatically shielded, and a first control character obtained after the conversion and a data character are directly output.

Further, the first data block and the third data block are further parsed. If it is obtained after the parsing that the input data stream is "10 1010 K0D1K2D3", "K0" and "K2" are further parsed. The control character block conversion table shown in FIG. 5 is searched, the 4-bit second control character blocks are input, and 8-bit first control character blocks "C0" and "C2" are separately output by searching the table. The second data block and the fourth data block are data character blocks and are not converted; four 8-bit data blocks "C0D1D2D3" obtained after the conversion are finally output, and are 32 bits in total. In addition, a quantity of the second control character blocks among the input data blocks is at least two, and therefore the last few bits in the input data blocks are a randomly-padded binary code, which aims to ensure that the input data blocks have 34 bits. During the 32-bit to 34-bit decoding, the randomly-padded binary code may be ignored; the 4-bit second control character blocks are converted into the 8-bit first control character blocks by searching the control character block conversion table, and the randomly-padded binary code does not exist.

According to the introduction to the function of each module in the optical network device, the optical network device provided in this embodiment of the present disclosure resolves a problem that a system overhead is high and a line cannot be detected due to an existing decoding scheme of the optical network system. Adopting a new encoding scheme without changing a line rate reduces the system overhead and implements line detection, which is easy to implement and greatly improves various types of performance of the system.

An embodiment of the present disclosure further provides a communications system, where the communications system includes at least two optical network devices. Specifically, the first optical network device is shown in FIG. 12, and a second optical network device is shown in FIG. 14.

Specifically, the first optical network device includes:

a first interface unit 1200, configured to receive a data stream from a physical medium attachment layer at a line rate, where the data stream is a data stream on which 8-bit/10-bit encoding has been performed, and perform serial-to-parallel conversion on the received data stream;

an 8-bit/10-bit decoder 1204, configured to perform 8-bit/10-bit decoding on the received data stream, and output the data stream on which the 8-bit/10-bit decoding has been performed;

a 32-bit to 34-bit encoder 1206, configured to perform 32-bit to 34-bit encoding on the output data stream on which the 8-bit/10-bit decoding has been performed, and output the data stream on which the 32-bit to 34-bit encoding has been performed;

a forward error correction encoder 1208, configured to perform forward error correction encoding on the output data stream on which the 32-bit to 34-bit encoding has been performed, and output the data stream on which the forward error correction encoding has been performed;

a first bit width converter 1210, configured to perform bit width conversion of 34-bit/10-bit on the output data stream on which the forward error correction encoding has been performed; and a second interface unit 1212, configured to send the data stream on which the bit width conversion has been performed to a physical medium dependent layer at the line rate.

The first optical network device further includes:

a first synchronizing unit 1202, configured to synchronize the data stream on which the 8-bit/10-bit encoding has been performed.

The first optical network device further includes:

a scrambler, configured to scramble the data stream except the first synchronization head or the second synchronization head in the data stream on which the 32-bit to 34-bit encoding has been performed. The scrambler is not marked in FIG. 12. The scrambler may be an independent device located between the 32-bit/34-bit encoder 1206 and the forward error correction encoder 1208; or the scrambler may be integrated in the 32-bit/34-bit encoder 1206.

The second optical network device further includes:

a third interface unit 1400, configured to receive a data stream from a physical medium dependent layer at a line rate, where the data stream is a data stream on which 32-bit to 34-bit encoding has been performed;

a second bit width converter 1404, configured to perform bit width conversion of 10-bit/34-bit on the received data stream;

a forward error correction decoder 1406, configured to perform forward error correction decoding on the data stream on which the bit width conversion has been performed;

a 32-bit to 34-bit decoder 1408, configured to perform 32-bit to 34-bit decoding on the data stream on which the forward error correction decoding has been performed;

an 8-bit/10-bit coder 1410, configured to perform 8-bit/10-bit encoding on the data stream on which the 32-bit to 34-bit decoding has been performed; and a fourth interface unit 1412, configured to send the data stream on which the 8-bit/10-bit encoding has been performed to a physical medium attachment layer.

Further, the second optical network device further includes:

a second synchronizing unit 1402, configured to synchronize the received data stream.

Further, the second optical network device further includes:

a descrambler, configured to descramble the data stream except the first synchronization head or the second synchronization head in the data stream on which the forward error correction decoding has been performed. The descrambler is not marked in FIG. 14. The scrambler may be an independent device located between the 32-bit/34-bit decoder 1408 and the forward error correction decoder 1406; or the scrambler may be integrated in the 32-bit/34-bit decoder 1408.

For specific inner composition structures of the 32-bit to 34-bit encoder and the 32-bit to 34-bit decoder, refer to FIG. 13 and FIG. 15 and the descriptions in the corresponding embodiments, and details are not described herein again.

Figure 16:
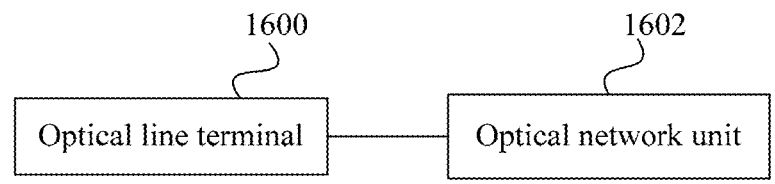
FIG. 16 is a schematic structural diagram of an optical network system.

An embodiment of the present disclosure further provides an optical network system, as shown in FIG. 16. The optical network system may be a WDMPON system or a GE system.

The optical network system includes at least: an optical line terminal 1600 and an optical network unit 1602, where the optical line terminal 1600 includes any first optical network device illustrated in FIG. 12, and the optical network unit 1602 includes any second optical network device illustrated in FIG. 14; or the optical network unit 1602 includes any first optical network device illustrated in FIG. 12, and the optical line terminal 1600 includes any second optical network device illustrated in FIG. 14. For specific composition structures of the first optical network device and the second optical network device, refer to FIG. 12, FIG. 14, and the descriptions in the corresponding embodiments. Further, for specific inner composition structures of the 32-bit to 34-bit encoder and the 32-bit to 34-bit decoder, refer to FIG. 13 and FIG. 15 and the descriptions in the corresponding embodiments, and details are not described herein again.

The communications system or the optical network system provided in this embodiment of the present disclosure includes at least two optical network devices. A new encoding scheme is implemented in the following manner: The first optical network device performs 32-bit to 34-bit encoding and FEC encoding on a received data stream, and outputs the encoded data stream to the second optical network device; and the second optical network device performs FEC decoding and 32-bit to 34-bit decoding on the received data stream, and then outputs the decoded data stream. In this way, a bandwidth resource of a line is saved; line monitoring can be implemented without interrupting a service, which is easy to implement and greatly improves various types of performance of the system.

Figure 17:
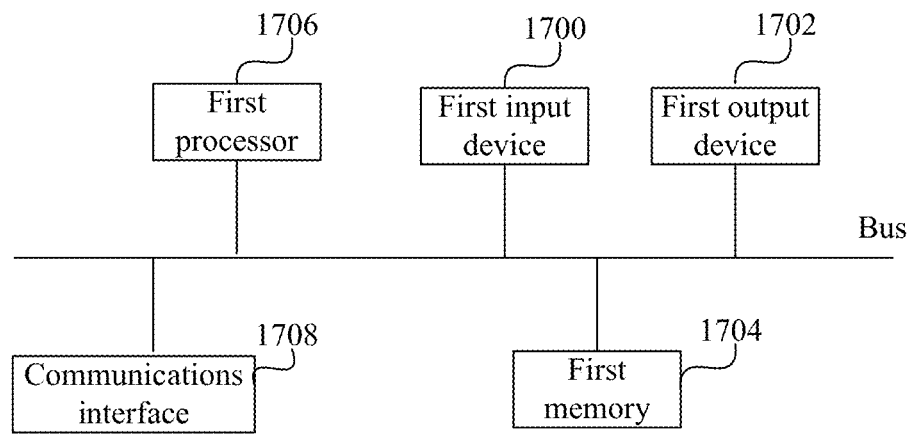
FIG. 17 is a schematic structural diagram of a computer system.

An embodiment of the present disclosure further provides a computer system for signal processing. As shown in FIG. 17, a general computer system structure is adopted for the computer system, and components that are used for signal processing and are in the computer system include:

a first input device 1700, configured to receive data;

a first output device 1702, configured to send the data;

a first memory 1704, which is configured to store a program and includes:

a first interface unit, configured to receive a data stream from a physical medium attachment layer at a line rate, where the data stream is a data stream on which 8-bit/10-bit encoding has been performed, and perform serial-to-parallel conversion on the received data stream;

an 8-bit/10-bit decoder, configured to perform 8-bit/10-bit decoding on the received data stream, and output the data stream on which the 8-bit/10-bit decoding has been performed;

a 32-bit to 34-bit encoder, configured to perform 32-bit to 34-bit encoding on the output data stream on which the 8-bit/10-bit decoding has been performed, and output the data stream on which the 32-bit to 34-bit encoding has been performed;

a forward error correction encoder, configured to perform forward error correction encoding on the output data stream on which the 32-bit to 34-bit encoding has been performed, and output the data stream on which the forward error correction encoding has been performed;

a first bit width converter, configured to perform bit width conversion of 34-bit/10-bit on the output data stream on which the forward error correction encoding has been performed; and a second interface unit, configured to send the data stream on which the bit width conversion has been performed to a physical medium dependent layer at the line rate; and a first processor 1706, coupled with the first input device 1700, the first output device 1702, and the first memory 1704, and configured to control execution of the program.

Specifically, the computer system may be specifically a processor-based computer, for example, a general purpose personal computer (PC), a portable device such as a tablet computer, or a smartphone. The computer system includes a bus, the first processor 1706, the first memory 1704, a communications interface 1708, the first input device 1700, and the first output device 1702. The bus may include a channel for transmitting information between components of a computer. The first processor 1706 may be a general purpose central processing unit (CPU), a microprocessor, an application-specific integrated circuit application-specific integrated circuit (ASIC), or one or more integrated circuits configured to control the execution of the program of the solution in the present disclosure. The computer system further includes one or more memories, which may be a read-only memory read-only memory (ROM) or a static storage device of another type, which is capable of storing static information and a static instruction, a random access memory random access memory (RAM) or a dynamic storage device of another type, which is capable of storing dynamic information and a dynamic instruction, or may be a magnetic disk memory. The one or more memories connect to the processor by using the bus.

The first input device 1700 includes an apparatus, for example, a keyboard, a mouse, a camera, a scanner, a light pen, a voice input apparatus, and a touchscreen, to receive data and information input or output by a user. The first output device 1702 may include an apparatus, including a screen, a printer, a loudspeaker, and the like, to allow outputting information to the user. The computer system further includes the communications interface 1708, which uses an apparatus such as a transceiver to communicate with another device or communications network, for example, an Ethernet network, a radio access network (RAN), and a wireless local area network (WLAN).

The first memory 1704, for example, a RAM, stores the program executing the solution of the present disclosure, and may also store an operating system and another application program. The memory stores a stored program or program code executing the solution of the present disclosure, and the processor controls the execution.

The program that executes the solution of the present disclosure and is in the first memory specifically include the first interface unit, the 8-bit/10-bit decoder, the 32-bit to 34-bit encoder, the forward error correction encoder, the first bit width converter, and the second interface unit. For a detailed description of a function of each part, refer to FIG. 12 and the description in the corresponding embodiment, and details are not described herein again. (It should be noted that this part provides further details of an apparatus related to an disclosure point, and structure subdivision may be performed according to different cases.)

The computer system for signal processing may be applied on an central office device in a GE system or a WDMPON system, for example, an optical line terminal, or may be applied on a terminal device in a GE system or a WDMPON system, for example, an optical network unit or an optical network terminal.

Figure 18:
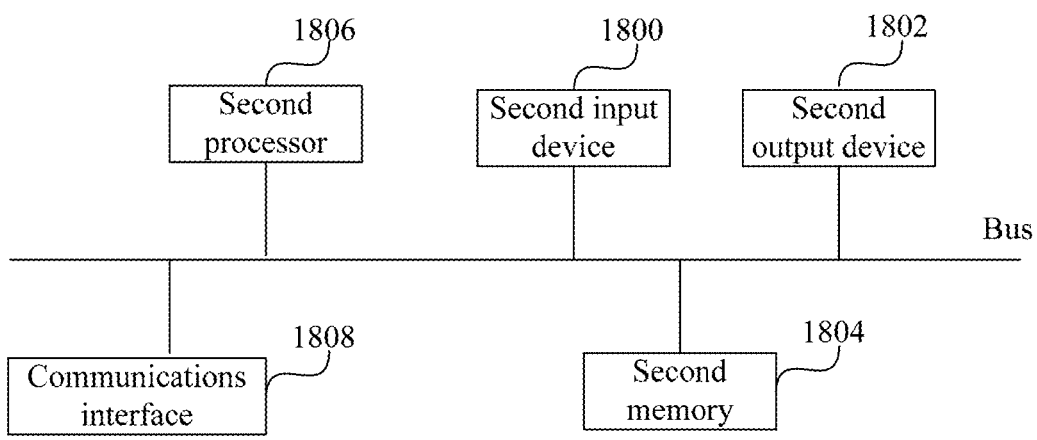
FIG. 18 is a schematic structural diagram of another computer system.

An embodiment of the present disclosure further provides another computer system for signal processing. As shown in FIG. 18, a general computer system structure is adopted for the computer system, and actions of signal processing executed by the computer system include:

a second input device 1800, configured to receive data;

a second output device 1802, configured to send the data;

a second memory 1804, which is configured to store a program and includes:

a third interface unit, configured to receive a data stream from a physical medium dependent layer at a line rate, where the data stream is a data stream on which 32-bit to 34-bit encoding has been performed;

a second bit width converter, configured to perform bit width conversion of 10-bit/34-bit on the received data stream;

a forward error correction decoder, configured to perform forward error correction decoding on the data stream on which the bit width conversion has been performed;

a 32-bit to 34-bit decoder, configured to perform 32-bit to 34-bit decoding on the data stream on which the forward error correction decoding has been performed;

an 8-bit/10-bit coder, configured to perform 8-bit/10-bit encoding on the data stream on which the 32-bit to 34-bit decoding has been performed; and a fourth interface unit, configured to send the data stream on which the 8-bit/10-bit encoding has been performed to a physical medium attachment layer.

Specifically, the computer system may be specifically a processor-based computer, for example, a general purpose personal computer (PC), a portable device such as a tablet computer, or a smartphone. The computer system includes a bus, a processor, the memory, a communications interface, the input device, and the output device. The bus may include a channel for transmitting information between components of a computer. A second processor may be a general purpose central processing unit (CPU), a microprocessor, an application-specific integrated circuit application-specific integrated circuit (ASIC), or one or more integrated circuits configured to control the execution of the program of the solution in the present disclosure. The computer system further includes one or more memories, which may be a read-only memory read-only memory (ROM) or a static storage device of another type, which is capable of storing static information and a static instruction, a random access memory random access memory (RAM) or a dynamic storage device of another type, which is capable of storing information and an instruction, or may be a magnetic disk memory. These memories connect to the processor by using the bus.

The second input device 1800 includes an apparatus, for example, a keyboard, a mouse, a camera, a scanner, a light pen, a voice input apparatus, and a touch screen, to receive data and information input or output by a user. The second output device 1802 may include an apparatus, including a screen, a printer, a loudspeaker, and the like, to allow outputting information to the user. The computer system further includes the communications interface 1808, which uses an apparatus such as a transceiver to communicate with another device or communications network, for example, an Ethernet network, a radio access network (RAN), and a wireless local area network (WLAN).

The second memory 1804, for example, a RAM, stores the program executing the solution of the present disclosure, and may also store an operating system and another application program. The memory stores a stored program or program code executing the solution of the present disclosure, and the processor controls the execution.

The program that executes the solution of the present disclosure and is in the second memory 1804 specifically include: the third interface unit, the second bit width converter, the forward error correction decoder, the 32-bit to 34-bit decoder, the 8-bit/10-bit coder, and the fourth interface unit. For a detailed description of a function of each part, refer to FIG. 14 and the description in the corresponding embodiment, and details are not described herein again. (It should be noted that this part provides further details of an apparatus related to an disclosure point, and structure subdivision may be performed according to different cases.)

The computer system for signal processing may be applied on an central office device in a GE system or a WDMPON system, for example, an optical line terminal, or may be applied on a terminal device in a GE system or a WDMPON system, for example, an optical network unit or an optical network terminal.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can carry or store expected program code in a form of an instruction or a data structure and can be accessed by a computer. In addition, any connection may appropriately become the computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and a disc (disc) used by the present disclosure includes a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A communications method for an optical network system, wherein the communications method comprises:
   receiving, via a processor, a data stream from a physical medium attachment layer at a line rate, wherein the received data stream has been 8-bit/10-bit encoded;
   performing via the processor, 8-bit/10-bit decoding on the received data stream to obtain a first data stream;
   receiving the first data stream according to each data block comprising eight bits to obtain four data blocks, wherein any one of the data blocks is a first control character block or a data character block, and any first control character block or any data character block is an 8-bit binary code;
   determining whether a first control character block exists among the four data blocks;
   performing via the processor, 32-bit to 34-bit encoding on the first data stream to obtain a second data stream the encoding comprises (a) adding a first synchronization head to a header of a first data block among the four data blocks if no first control character block exists among the four data blocks, and (b) outputting the data blocks to which the first synchronization head is added, wherein the first data block is an 8-bit binary code input first, the first synchronization head comprises a 2-bit first identifier and the first identifier is used to identify that the data blocks are all data character blocks;
   performing, via the processor, forward error correction encoding on the second data stream to obtain a third data stream;
   performing, via the processor, bit width conversion of 34-bit/10-bit on the third data stream to obtain a fourth data stream; and
   sending, via the processor, the fourth data stream to a physical medium dependent layer at the line rate.

2. The communications method according to claim 1, wherein encoding on the first data stream further comprises:
   when at least one first control character block exists among the four decoded data blocks, adding a second synchronization head to a header of a first data block among the four decoded data blocks, wherein the first data block is an 8-bit binary code input first, the second synchronization head comprises a 2-bit second identifier, and the 2-bit second identifier is used to identify that at least one first control character block exists among the four decoded data blocks;
   generating, according to a quantity of the first control character blocks and a location of each of the first control character blocks, a 4-bit control character block location mapping code, and setting the 4-bit control character block location mapping code in a location after the second synchronization head and adjacent to the second synchronization head;
   converting each of the first control character blocks into a 4-bit second control character block; and
   outputting a processed data block, wherein the processed data block comprises one of the following:
   (a) the second synchronization head, the 4-bit control character block location mapping code, and the 4-bit second control block, and
   (b) the second synchronization head, the 4-bit control character block location mapping code, the 4-bit second control character block, and the data character blocks.

3. The communications method according to claim 2, wherein the outputting the processed data blocks comprises:
   when the four decoded data blocks further comprise at least one data character block, performing no processing on the at least one data character block, and retaining the data character block; and
   outputting the processed data blocks, wherein the processed data blocks comprises the second synchronization head, the 4-bit control character block location mapping code, the 4-bit second control character block, and the data character block.

4. A communications method for an optical network system comprising:
   receiving, via a processor, a data stream from a physical medium dependent layer at a line rate, wherein the received data stream has been 32-bit to 34-bit encoded;
   performing, via the processor, bit width conversion of 10-bit/34-bit on the received data stream to obtain a first data stream;
   performing, via the processor, forward error correction decoding on the first data stream to obtain a second data stream;
   parsing the second data stream and outputting 51 data blocks, wherein any one of the data blocks is a second control character block or a data character block, any second control character block is a 4-bit binary code, and any data character block is an 8-bit binary code;

parsing any one of the data blocks, and obtaining a synchronization head of the data blocks, wherein the synchronization head comprises first or second synchronization heads, the first synchronization head comprising a 2-bit first identifier for identifying the data block is a data character block, the second synchronization head comprising a 2-bit second identifier for identifying that at least one second control character block exists among the data blocks; and determining whether the synchronization head of the any one of the data blocks is a first or second synchronization head;

performing via the processor 32-bit to 34-bit decoding on the second data stream to obtain a third data stream comprising (a) deleting the first synchronization head if the synchronization head is a first synchronization head and (b) outputting the data blocks from which the first synchronization head is deleted;

performing via the processor, 8-bit/10-bit encoding on the third data stream to obtain a fourth data stream; and sending, via the processor, the fourth data stream to a physical medium attachment layer.

5. The communications method according to claim 4, wherein the performing 32-bit to 34-bit decoding on the second data stream comprises:

when the synchronization head is the second synchronization head, parsing the first data block, and obtaining a 4-bit control character block location mapping code;

obtaining a quantity of the second control character blocks and a location of each of the second control character blocks according to the 4-bit control character block location mapping code;

converting the second control character block into an 8-bit first control character block according to the quantity of the second control character blocks and the location of each of the second control character blocks;

deleting the second synchronization head and the 4-bit control character block location mapping code from the data blocks, wherein the 4-bit control character block location mapping code is in a location after the second synchronization head and adjacent to the second synchronization head; and outputting a processed data block, wherein the processed data block comprises: the first control character block in 8-bit binary code and/or the data character block in 8-bit binary code.

6. The communications method according to claim 5, wherein the outputting the processed data block comprises:

when the data blocks further comprise at least one data character block, performing no processing on the data character block, and retaining the data character block; and outputting a processed data block, wherein the processed data block comprises: the first control character block and the data character block.

7. An optical network device, comprising first input and output devices, a memory and a processor:

the first input device configured to receive a data stream on which 8-bit/10-bit encoding has been performed from a physical medium attachment layer at a line rate, where the data stream includes information provided by a user;

the memory configured to store program code executable by the processor;

the processor coupled with the first input and output devices, and the memory, and, when executing the program code stored in the memory, is configured to:

perform serial-to-parallel conversion on the received data stream;

perform 8-bit/10-bit decoding on the received data stream;

form four data blocks according to each data block comprises an eight bits, wherein any one of the data blocks is a first control character block or a data character block, and any first control character block or any data character block is an 8-bit binary code; and determine whether a first control character block exists among the four data blocks;

if no first control character block exists among the four data blocks, add a first synchronization head to a header of a first data block among the four data blocks, wherein the first data block is an 8-bit binary code input first, the first synchronization head comprises a 2-bit first identifier, and the first identifier is used to identify that the data blocks are all data character block;

perform 32-bit to 34-bit encoding on the received data stream;

perform forward error correction encoding on the received data stream; and perform bit width conversion of 34-bit/10-bit on the received data stream; and the first output device configured to send the received data stream on which the bit width conversion has been performed to the user by way of a physical medium dependent layer at the line rate.

8. The optical network device according to claim 7, wherein the processor further configured to:

when at least one first control character block exists among the four decoded data blocks, add a second synchronization head to a header of a first data block among the four decoded data blocks, wherein the first data block is an 8-bit binary code input first, the second synchronization head comprises a 2-bit second identifier, and the 2-bit second identifier is used to identify that at least one first control character block exists among the four decoded data blocks;

generate, according to a quantity of the first control character blocks and a location of each of the first control blocks, a 4-bit control character block location mapping code, and set the 4-bit control character block location mapping code in a location after the second synchronization head and adjacent to the second synchronization head;

convert the first control character block into a 4-bit second control character block; and output a processed data block, wherein the processed data block comprises one of the following:

(a) the second synchronization head, the 4-bit control character block location mapping code, and the 4-bit second control character block, and (b) the second synchronization head, the 4-bit control character block location mapping code, the 4-bit second control character block and the data character block.

9. The optical network device according to claim 8, wherein the processor is configured to:

when the four decoded data blocks further comprise at least one data character block, perform no processing on the data character block, and retain the data character block; and output the processed data block, wherein the processed data block comprises the second synchronization head, the 4-bit control character block location mapping code, the 4-bit second control character block, and a data block of the data character block.

10. An optical network device comprising input and output devices, a memory and a processor:

the input device configured to receive a data stream from a physical medium dependent layer at a line rate, wherein the received data stream has been 32-bit to 34-bit encoded;

the memory configured to store program code for execution by the processor;

the processor coupled with the input and output devices and the first memory so as to be configured when executing the program code to:

perform bit width conversion of 10-bit/34-bit on the received data stream to obtain a first data stream to obtain a first data stream;

perform forward error correction decoding on the first data stream to obtain a second data stream;

parse the second data stream and output 51 data blocks, wherein any one of the data blocks is a second control character block or a data character block, any second control character block is a 4-bit binary code, and any data character block is an 8-bit binary code;

parse any one of the data blocks, and obtain a synchronization head of the any one of the data blocks, wherein the synchronization head comprises: a first synchronization head or a second synchronization head, the first synchronization head comprises a 2-bit first identifier, the first identifier is used to identify that the data blocks are all data character blocks, the second synchronization head comprises a 2-bit second identifier, and the second identifier is used to identify that at least one second control character block exists among the data blocks; and determine whether the synchronization head of the any one of the data blocks is a first synchronization head or a second synchronization head;

if the synchronization head is a first synchronization head, delete the first synchronization head, and output the data blocks from which the first synchronization head is deleted;

perform 32-bit to 34-bit decoding on the second data stream to obtain a third data stream;

perform 8-bit/10-bit encoding on the third data stream to obtain a fourth data stream; and send the fourth data stream to a physical medium attachment layer.

* * * * *